US012416280B2

(12) United States Patent
Kukler

(10) Patent No.: US 12,416,280 B2
(45) Date of Patent: Sep. 16, 2025

(54) HIGH-PRESSURE FUEL INJECTION SYSTEM

(71) Applicant: Ron Kukler, Idaho Falls, ID (US)

(72) Inventor: Ron Kukler, Idaho Falls, ID (US)

(73) Assignee: RK IP Holdings, LLC, Idaho Falls, ID (US)

( * ) Notice: Subject to any disclaimer, the term of this patent is extended or adjusted under 35 U.S.C. 154(b) by 0 days.

(21) Appl. No.: 18/497,022

(22) Filed: Oct. 30, 2023

(65) Prior Publication Data

US 2024/0141856 A1 May 2, 2024

Related U.S. Application Data

(60) Provisional application No. 63/421,695, filed on Nov. 2, 2022.

(51) Int. Cl.

*F02M 47/02* (2006.01)
*F02M 61/08* (2006.01)
*F02M 61/10* (2006.01)
*F02M 63/00* (2006.01)

(52) U.S. Cl.

CPC .......... *F02M 47/022* (2013.01); *F02M 61/08* (2013.01); *F02M 61/10* (2013.01); *F02M 63/0015* (2013.01)

(58) Field of Classification Search

CPC .... F02M 47/027; F02M 47/022; F02M 47/02; F02M 45/02; F02M 45/04; F02M 45/08; F02M 45/083; F02M 45/086; F02M 61/08; F02M 61/10; F02M 63/0015; F02M 2200/44; F02M 2200/46; F02M 2700/4364; F02D 41/30; F02D 41/32; F02D 41/34; F02D 41/345; F02D 41/365; F02D 41/402; F02D 41/401; F02D 41/40; F02D 41/38; F02D 41/3836

See application file for complete search history.

(56) References Cited

U.S. PATENT DOCUMENTS

| | | | | |
|---|---|---|---|---|
| 4,168,804 A | 9/1979 | Hofmann | | |
| 5,241,935 A | 9/1993 | Beck | | |
| 5,484,104 A * | 1/1996 | Kukler | F02M 49/02 | 123/496 |
| 6,113,000 A * | 9/2000 | Tian | F02M 57/026 | 239/533.8 |
| 6,883,491 B2 * | 4/2005 | Arndt | F02B 23/105 | 123/305 |

(Continued)

FOREIGN PATENT DOCUMENTS

| | | | |
|---|---|---|---|
| EP | 2256332 A2 * | 12/2010 | F02M 47/025 |
| WO | WO-9304275 A1 * | 3/1993 | F02M 49/02 |

(Continued)

*Primary Examiner* — Grant Moubry

(74) *Attorney, Agent, or Firm* — Lambert Shortell & Connaughton; David J. Connaughton, Jr.; Justin P. Tinger

(57) ABSTRACT

A fuel injector is provided. The fuel injector is operable to inject fuel at extremely high pressures which creates very small droplet sizes, allowing for efficient self-ignition of the fuel and allows for clean, efficient combustion due to the small droplet sizes. The fuel injector uses pressure from within a combustion chamber to actuate the spraying of fuel from the injector, thereby solving many problems experienced by typical fuel injectors and eliminating many problem-components of prior art fuel injectors.

26 Claims, 33 Drawing Sheets

SECTION M-M

(56) References Cited

U.S. PATENT DOCUMENTS

| | | | | |
|---|---|---|---|---|
| 7,182,070 | B2 | 2/2007 | Magel | |
| 8,844,842 | B2 | 9/2014 | Kim | |
| 10,544,766 | B2 | 1/2020 | Kukler | |
| 11,459,990 | B2 | 10/2022 | Meldolesi | |
| 2003/0155444 | A1 * | 8/2003 | Lawes .................... | F02M 51/04<br>239/585.1 |
| 2022/0082071 | A1 | 3/2022 | Spegar et al. | |

FOREIGN PATENT DOCUMENTS

| | | |
|---|---|---|
| WO | 2021116200 | 6/2021 |
| WO | 2021116204 | 6/2021 |
| WO | 2021116213 | 6/2021 |
| WO | 2021116214 | 6/2021 |
| WO | 2021116216 | 6/2021 |

* cited by examiner

DETAIL H
SCALE 10 : 1

SECTION G-G 6
83
82
81
G
G
61
28
27
84
H
SECTION G-G 82
27
84
DETAIL H
SCALE 10 : 1

Stage 1

Stage 2

Stage 3

Stage 4

HIGH-PRESSURE FUEL INJECTION SYSTEM

TECHNICAL FIELD

The present invention relates to improving upon traditional fuel injection systems to provide cleaner and more efficient combustion systems. More particularly, the present invention relates to a high-pressure fuel injection system.

BACKGROUND

Internal combustion engines, such as those used in automobiles and industrial equipment, rely on fuel injectors to atomize and deliver fuel into the combustion chamber. In some cases, the fuel injectors used are high-pressure fuel injectors, which can improve atomization and thus achieve a more complete combustion, improving efficiency. The efficiency and emissions characteristics of these engines are highly dependent on the precise operation of these fuel injectors.

One of the problems of current fuel injection systems are currently able to reach pressures between 25-35 ksi greater than. Most common rail injectors provide pressures around 29 ksi, but these types of systems require expensive maintenance to try and operate at the higher pressures. Those additional costs often offset the increases in fuel efficiency and power, and to even some extent the cleaner emissions benefit.

Additionally, high-pressure fuel injectors suffer from a number of other problems and challenges, which can significantly impact engine performance and environmental compliance. Some of these issues are discussed below.

Clogging and Deposits: High-pressure fuel injectors often suffer from clogging due to the accumulation of contaminants and deposits in the injector nozzles. This can disrupt the spray pattern and fuel atomization, leading to poor combustion efficiency, increased emissions, and reduced engine performance.

Wear and Tear: The high-pressure environment within fuel injectors exposes them to significant wear and tear. Repeated cycling of the injector valve and high-pressure fuel flow can lead to degradation of critical components, resulting in decreased injector performance and shortened lifespan.

Leakage and Drips: Fuel injector seals and components can develop leaks over time, leading to fuel drips and erratic spray patterns. This can result in fuel wastage, engine misfires, and increased emissions.

Inconsistent Fuel Delivery: Variations in fuel delivery among different injectors within an engine can cause imbalances in cylinder-to-cylinder fuel distribution. This leads to reduced engine efficiency and performance.

Injector Noise and Vibrations: The operation of high-pressure fuel injectors can generate noise and vibrations, which can be undesirable for vehicle occupants and result in increased wear on injector components.

High Maintenance Costs: Frequent maintenance and replacement of fuel injectors can be costly for vehicle owners and fleet operators.

The systems described herein seek to solve these above problems and provide several advantages that will become apparent to those skilled in this art.

SUMMARY

The present invention overcomes the problems and challenges associated with high-pressure fuel injectors by providing a novel and improved design that addresses the issues described above. This invention incorporates innovative features and materials to enhance the performance, durability, and reliability of high-pressure fuel injectors while also minimizing maintenance requirements.

By addressing these challenges, the present disclosure improves engine efficiency, reduces emissions, lowers operating costs, and enhances the overall performance of internal combustion engines employing high-pressure fuel injectors. The fuel injector of the present disclosure may find applications in a wide range of industries, including automotive, marine, aviation, and industrial equipment, where internal combustion engines are utilized. Further still, the fuel injector disclosed herein may be used with many different fuels in spark-ignited or self-ignited engine configurations.

The present application relates to a high-pressure fuel injection system comprising: 1) an injection nozzle assembly having a plurality of apertures, wherein a first subgroup of the plurality of apertures each have a first diameter, wherein a second subgroup of the plurality of apertures each have a second diameter, and wherein the first subgroup and second subgroup are configured to atomize fuel differently. In certain embodiments, the length of the apertures in the injection nozzle may also be adjusted to control the spray pattern/location from the aperture 2) a high-pressure piston configured to be in fluid communication with the injection nozzle assembly; 3) a volume displacement valve disposed between the injection nozzle assembly and the high-pressure piston; 4) a low-pressure piston disposed around the high-pressure piston; 5) a high-pressure barrel interfacing with the high-pressure piston; 6) a needle barrel at least partially disposed within the high-pressure barrel; and 7) a shut-off valve disposed within the needle barrel.

The high-pressure fuel injection system above can further include a shuttle housing having an inlet port and an outlet port, wherein the inlet port is in fluid communication with at least one channel that provides fuel to high-pressure barrel.

The high-pressure fuel injection system above can further include a single solenoid valve that is configured to control fluid flow into the shuttle housing.

Of course, the present invention is not limited to the above features and advantages. Those of ordinary skill in the art will recognize additional features and advantages upon reading the following detailed description, and upon viewing the accompanying drawings.

DETAILED DESCRIPTION

Of course, the present invention is not limited to the above features and advantages. Those of ordinary skill in the art will recognize additional features and advantages upon reading the following detailed description, and upon viewing the accompanying drawings.

As noted above, one of the last major innovations to the fuel injector art was that of the common rail direct injection (CRDI) system. Some of the advantages the common rail system brought to the industry were improved reduction of exhaust, better fuel efficiency and overall engine performance. By pressurizing a common rail, the fuel is constantly under pressure, which served as advantage over previous systems, which required increased engine speed to generate higher pressures. The higher injection pressures help to enable better atomization of fuel.

Atomization of fuel is important for a number of reasons. The smaller the mean droplet size of fuel that is generated, the easier it is to obtain a complete burn. The combustion process provides for fuel to combine with oxygen to combust. If the diameter of the droplet is larger than it increases the chances for an incomplete burn, as oxygen is unable to combine with the inner portion of the droplet, which in turn can generate particulates that get produced and become part of the exhaust. These particulates then pollute the air and water. Thus, one of the objectives of the present application is to provide a system that produces greater than 35 ksi, greater than 40 ksi, greater than 50 ksi, greater than 60 ksi, greater than 70 ksi, and even greater than 80 ksi. This results in a mean droplet size that are sub-micron (μm) in size. By comparison, the CRDI produces droplets with a diameter in 10-20 thousandths range or several hundred microns or micrometers (μm). How this accomplished will become apparent as the system is described in more detail below and in particular reviewing FIGS. 19A-D, which discuss the various stages of the high-pressure fuel injection system embodiments provided herein.

Droplet size is one aspect of helping produce a more complete combustion system; however, other factors including where the combustion occurs in the chamber, as well as ensuring nozzle drips are eliminated can also impact how complete the combustion becomes and thus reduce the number of particulates being exhausted from the system. The high-pressure fuel injection system addresses the positioning aspect by providing for varying diameter and shaped apertures about the injection end of the injection nozzle assembly, which is comprised of the injection nozzle and the nozzle ring.

Figure 17A:
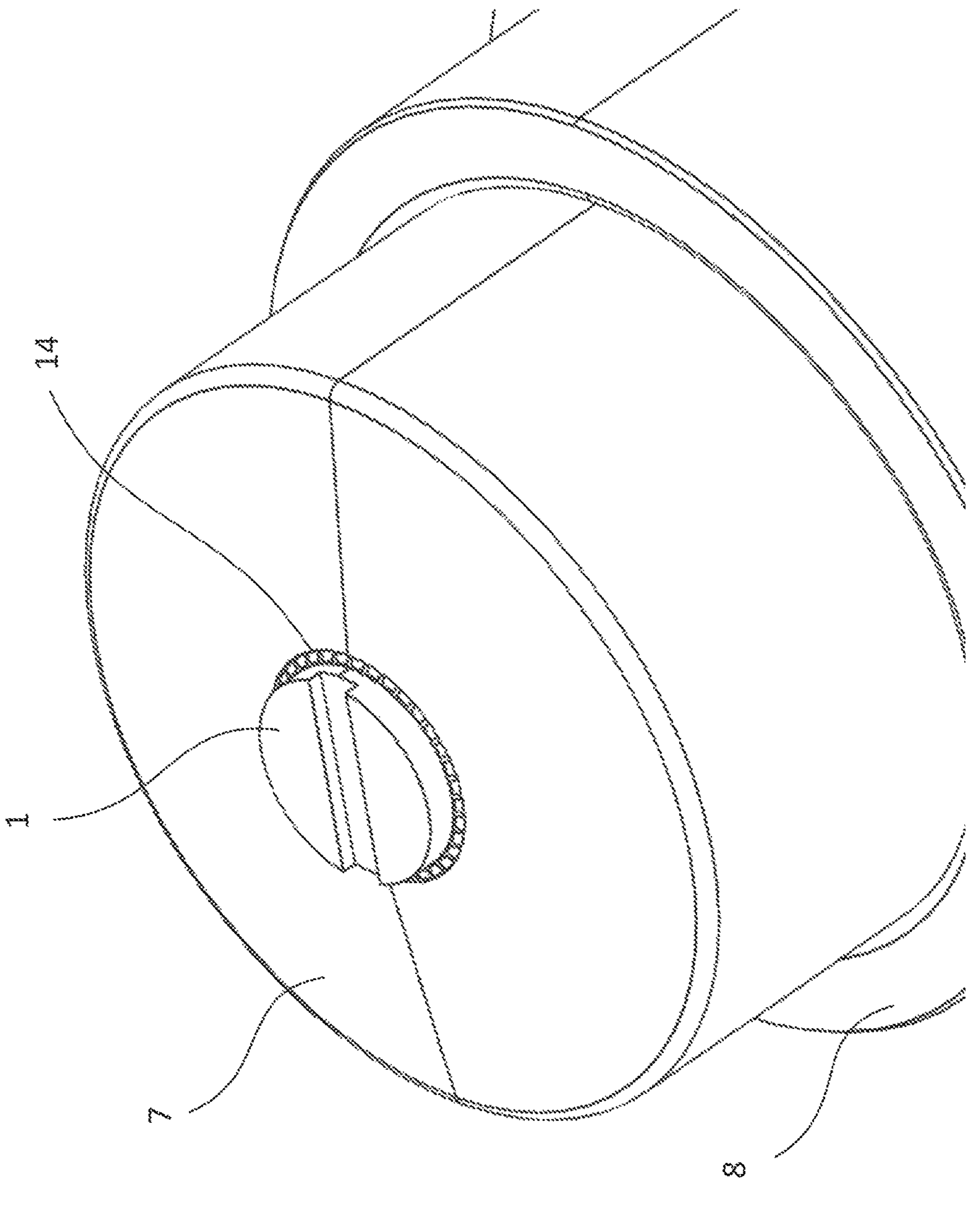
FIGS. 17A, 17B, 17C, and 17D illustrate various close-up views of the injection nozzle assembly and spray patterns resulting from the various-sized apertures.
Figure 17B:
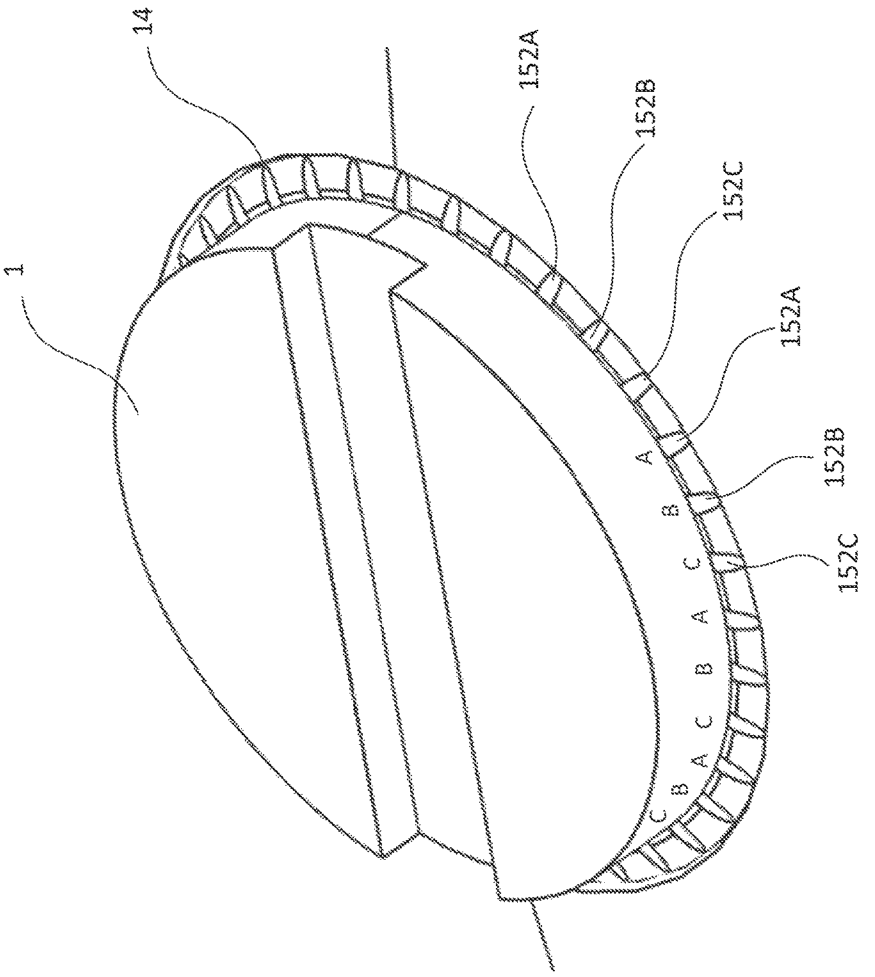
Figure 17C:
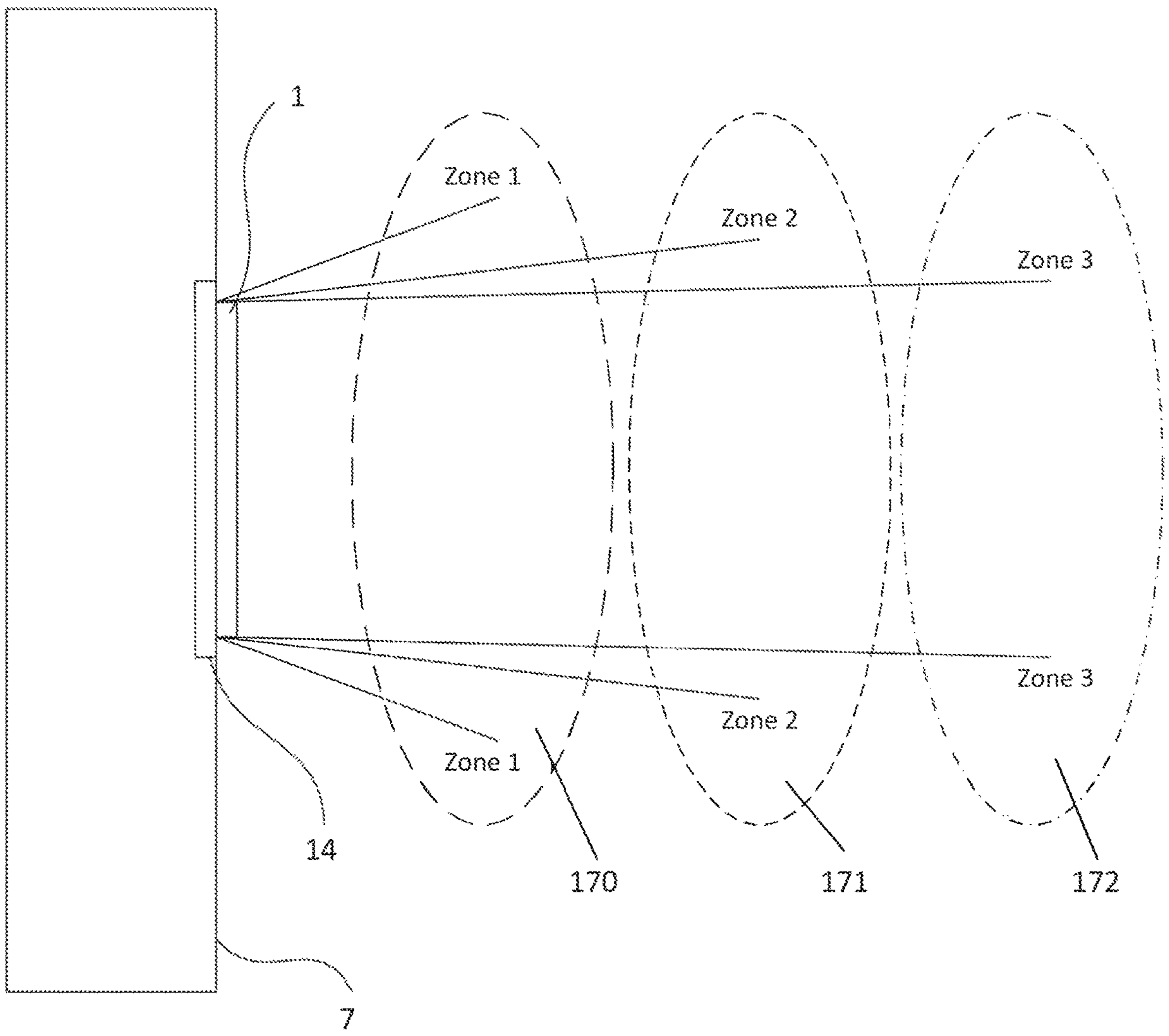

For example, FIG. 17B illustrates an injection nozzle 1 having a nozzle ring 14 with an alternating pattern of apertures 152A, 152B, 152C, that have different hole diameters notably diameter A, diameter B, and diameter C. Each of these varying diameters causes the droplet size to be altered, which in turn changes the trajectory of the fuel droplets. FIG. 17C shows the three varying aperture sizes in the nozzle ring 14 of the nozzle 1, which is mounted to the low-pressure piston 7. The three different aperture sizes produce droplets that are directed towards three different zones: 170, 171, and 172 within the combustion chamber. It should be noted that the number of varying sized apertures could be as low as two, which target near and far parts of the combustion chamber or there could be three, four, five, six, or more, which target zones of the chamber from one end to the other. In one embodiment, the fuel injector nozzle 1 may have many different variations of aperture sizes, lengths, and pressures, allowing for up to fifteen different combustion zones which can be positioned at the user's command.

Additionally, it should be noted that the cross-sectional shape of the injection apertures where the fuel is forced through can be altered as well. The change in shape can also contribute to the trajectory and size of the droplets being produced. In short, the principle of intentionally targeting zones within the combustion can assist with a more uniform combustion in the chamber as opposed to being heavy on one end and less uniform. A more uniform combustion spread across the entire chamber helps reduce incomplete combustion.

Another feature provided in these embodiments is a one-way valve (shown as the volume displacement valve 11 in FIGS. 2B, and 13A-C), which eliminates sac volume. Sac volume is small volume within the fuel flow path of an electronic fuel injector that can drip into the combustion chamber. By providing a meniscus and a one-way valve 11 (with a spring) integrated close to the inlet of the injection nozzle 1, it creates a negative pressure once fuel is injected by its rearward movement away from the nozzle opening. This negative pressure holds any fuel that might be part of this sac volume back into the injection nozzle flow path 29. The principle is similar to sucking a fluid through a straw, when a user quickly caps one end of the straw. Any fluid in the straw stays or remains until the finger or seal created on one end of the straw is released. Similarly, the volume displacement valve 11 creates this negative pressure by sealing an inlet end of flow path 29 and any fluid therein does not get released until the next injection cycle, thus eliminating the sac volume problem apparent in many injectors today. The portion of the channel 27 where the volumed displacement valve 11 resides has a larger diameter than the end-portion 29 of the channel that distributes the fuel through each of the apertures positioned about the injection end of the injection nozzle assembly. This larger volume combined with the smaller cross-section helps ensure there isn't any leakage of the sac volume.

Figure 1A:
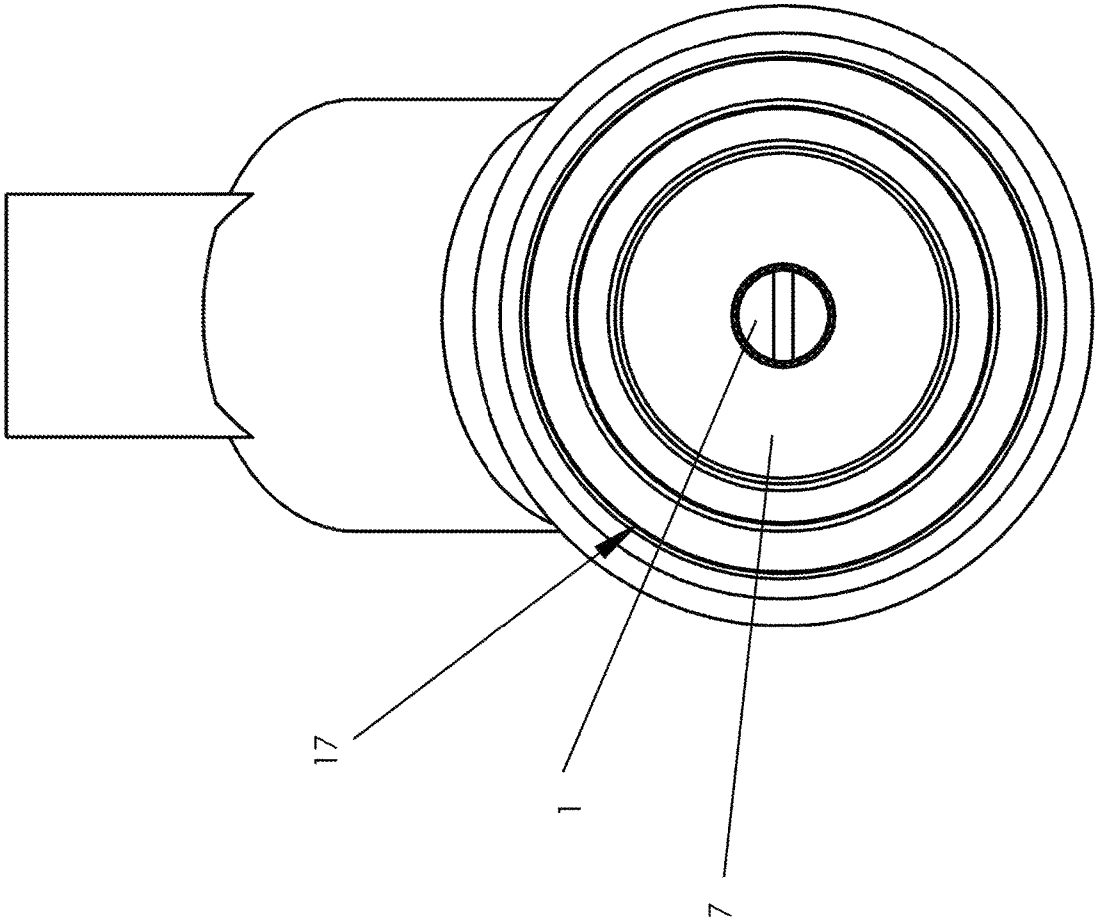
FIGS. 1A, 1B, 1C, and 1D, illustrate various views of a single solenoid high pressure fuel injection system.
Figure 1B:
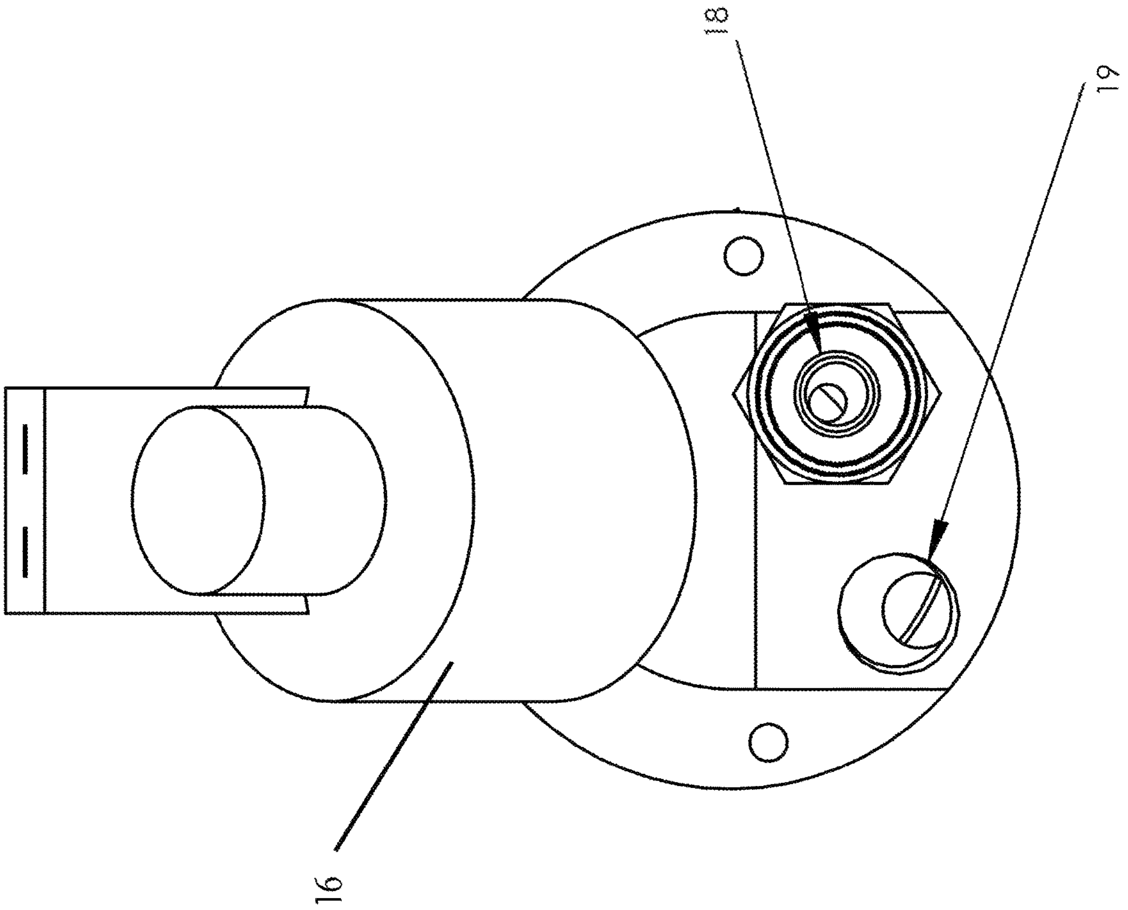
Figure 1C:
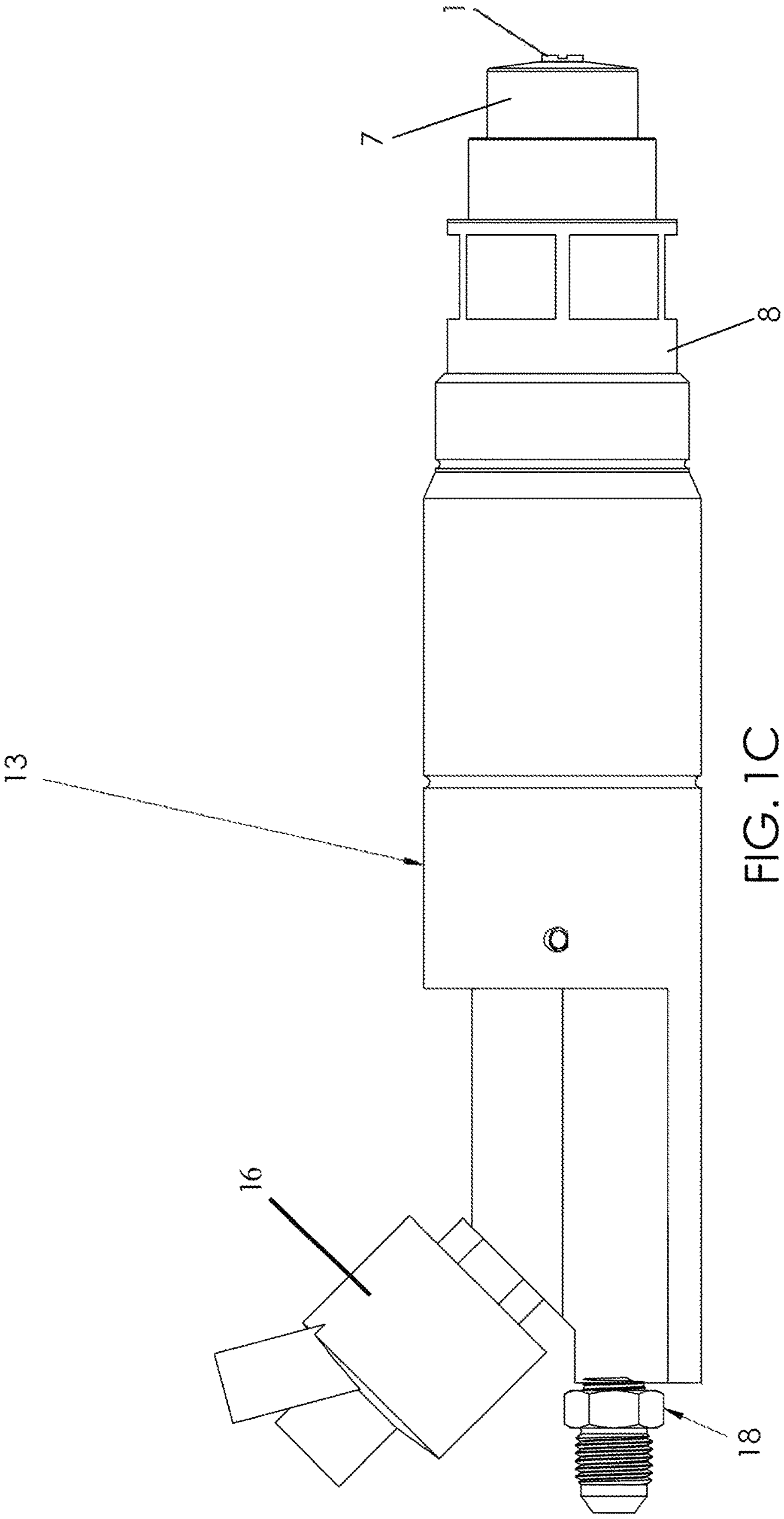
Figure 1D:
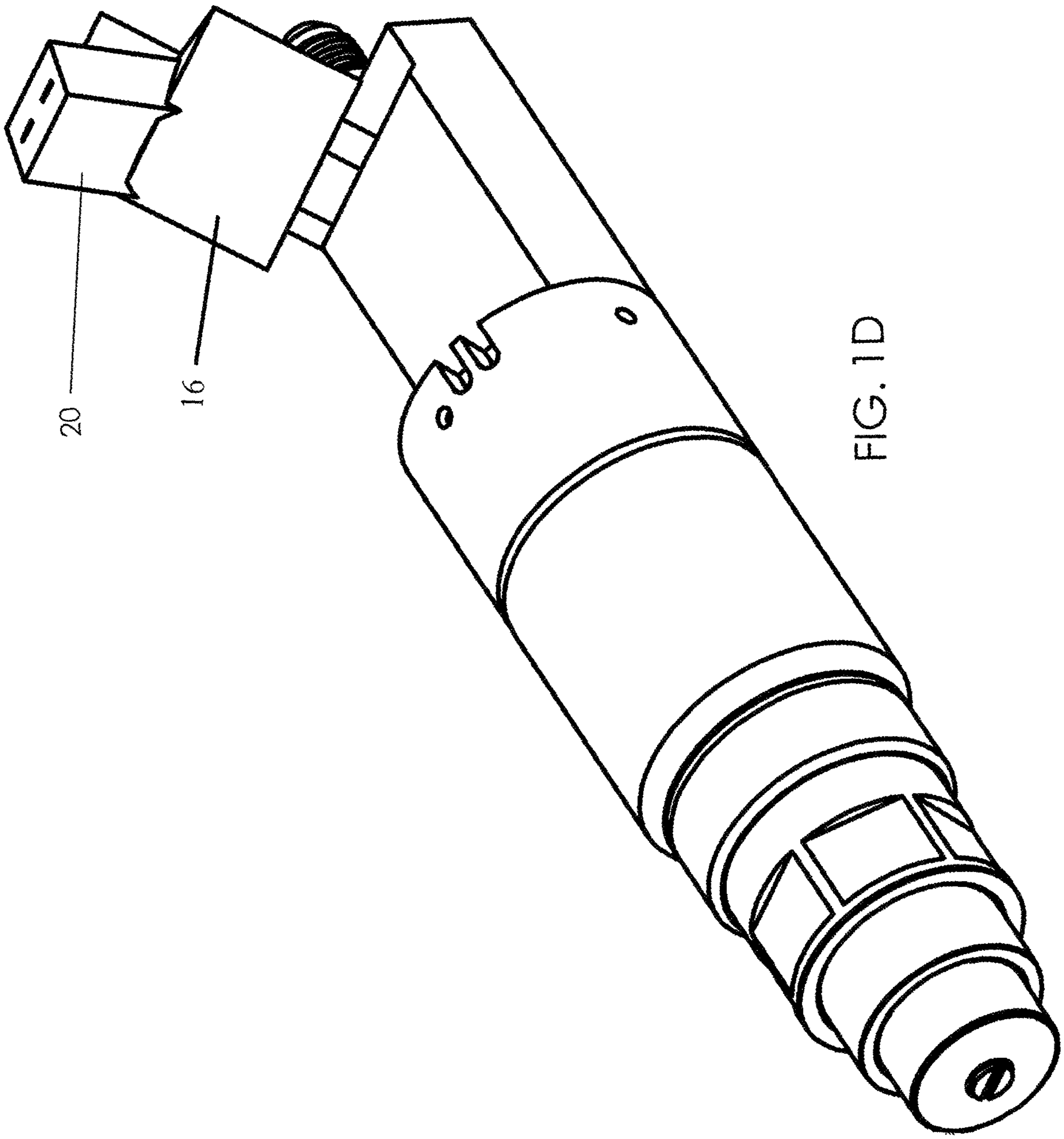

Referring now to FIGS. 1A-F, which illustrate various views of a single solenoid high pressure fuel injection system. FIG. 1A is a front view showing the injection end. A copper seal 17 extends around a perimeter. The low pressure piston 7 and nozzle 1 can be seen in, for example, FIGS. 1A, 1C. FIG. 1B is the back view showing the inlet port 18 and outlet port 19, along with the single solenoid 16 valve. This can be, for example, a BECK solenoid valve. FIG. 1C is a side view showing the labeled shuttle housing 13 of the rear portion of the fuel injector and low-pressure barrel 8 of the front portion of the fuel injector, with low-pressure piston 7 and nozzle 1 at the front end. FIG. 1D is a perspective view showing a connector bracket 20.

Figure 2A:
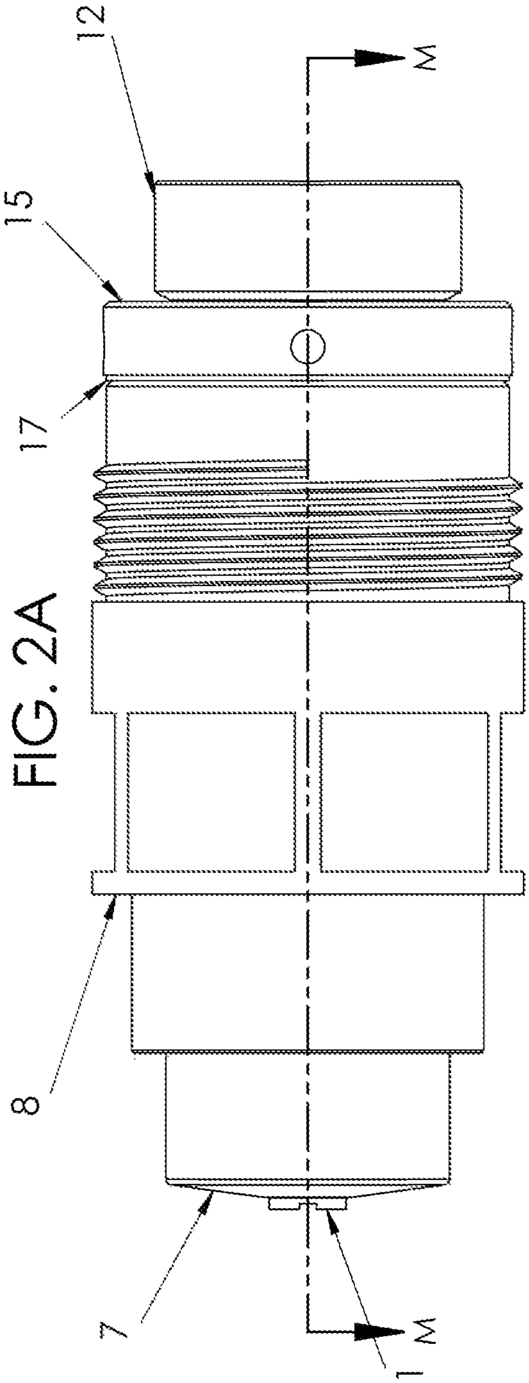
FIGS. 2A and 2B illustrate the front end of the single solenoid high pressure fuel injection system of FIGS. 1A-D without the shuttle housing and solenoid.
Figure 2B:
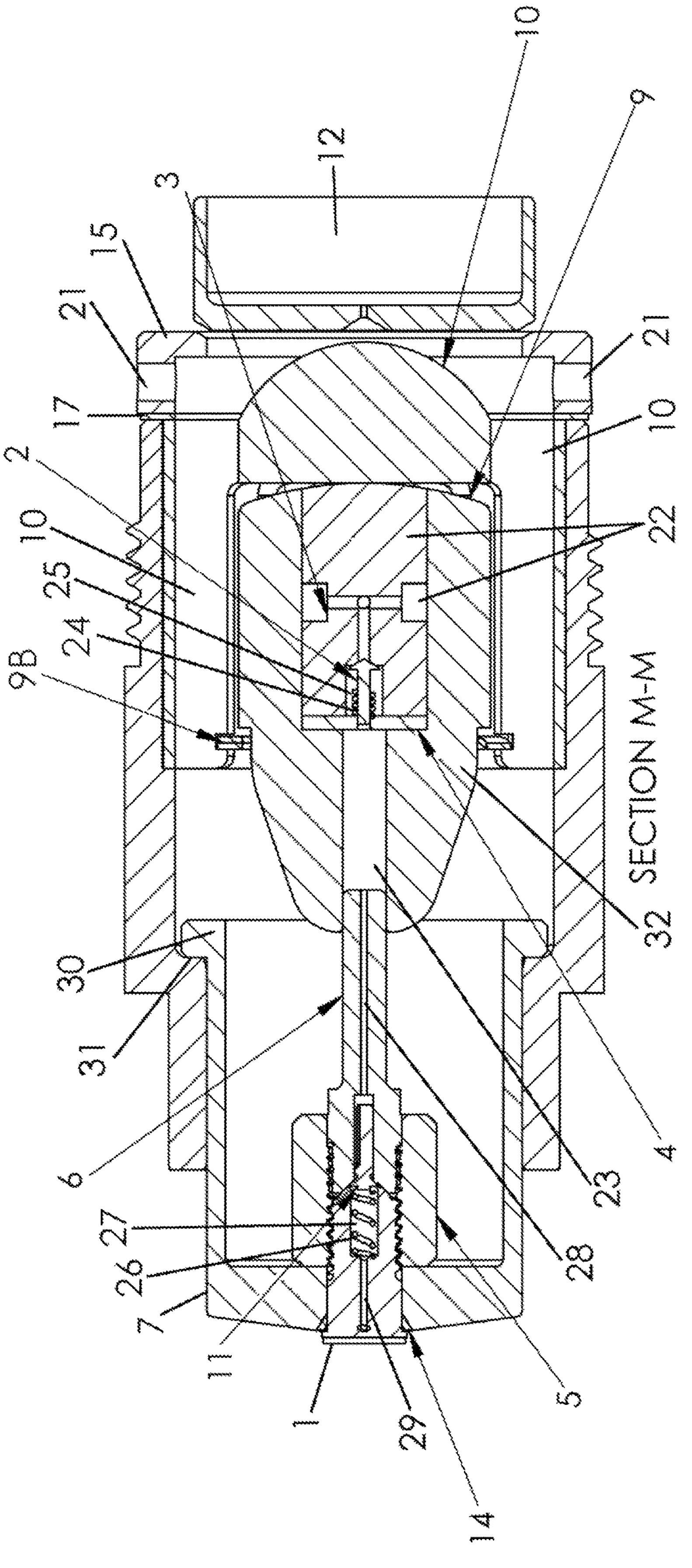

FIGS. 2A-B illustrate the front end of the single solenoid high pressure fuel injection system of FIGS. 1A-F without the shuttle housing 13 and solenoid 16. As shown in the FIGS. 1A-F, the body of the fuel injector is defined by the shuttle housing 13 at the rear portion, the low pressure barrel 8 at the front portion, and the low pressure piston 7 and nozzle 1 which extend from the front portion. A key aspect of the present invention is the low-pressure piston's 7 ability to actuate high pressure fuel injection in response to increasing pressure within the engine combustion chamber as a piston moves towards the injector, compressing gas within the combustion chamber and increasing the pressure therein.

In FIGS. 2A-B, each of the components are labeled including the shuttle 12, shuttle seal 15, injection nozzle 1 which has a nozzle ring 14 with apertures for spraying fuel. The injection nozzle 1 is connected to high-pressure piston 6 by, in this embodiment, the nozzle nut 5. Inside the high-pressure piston 6 is a volume displacement valve 11 which is biased in a closed position by spring 26. The volume displacement valve 11 and spring 26 are disposed between the injection nozzle 1 and high-pressure piston inlet and can move in a wide-diameter area 27. Upon a sufficient pressure differential between the inlet path 28 of the high-pressure piston 6 and the nozzle 1 aperture(s), the valve 11 is urged open by fluid pressure, allowing fluid to pass through the inlet path 28 to outlet path 29 and out of nozzle 1.

The low-pressure piston 7 encompasses part of the injection nozzle assembly and slides within low-pressure barrel 8. The leading face of the low-pressure piston 7 has a relatively large surface area so that pressure within the combustion chamber is able to apply a large force on the low-pressure piston 7, allowing the fuel injector to in turn pressurize the fuel within the low-pressure barrel 8 for effective spraying and atomization. The low pressure piston 7 has a flange 30 at its rear end which cannot pass the retaining flange 31 on the low pressure barrel 8, which controls a maximum outward movement position of the low-pressure piston 7. In one embodiment, the low-pressure piston 7 has an inductive position sensor to activate and/or monitor its position.

The high-pressure piston 6 slides within a high-pressure barrel 9. High-pressure barrel is held in place by the spiral internal retaining ring 9B. The high-pressure barrel 9 provides a flow path and housing for pressurized fuel and a chamber for the high-pressure piston 6 to pressurize and spray fuel. The high pressure barrel 9, in this embodiment, has a tapered front end 32 which creates a volume for fluid within the space between the high-pressure barrel front end 32 and internal volume defined by the low pressure barrel 8 and low-pressure piston 7 Also within the high-pressure barrel 9 is a needle valve 2 which sits in a needle valve barrel 3 and needle retainer 4. The needle valve 2 is a shut off valve which is urged open upon a sufficient pressure differential between the fluid inlet 22 and high-pressure chamber 23. A spring 24 seats at region 25 and urges the needle valve 2 into a closed position against valve barrel 3. A pressure on the inlet 22 side sufficient to overcome spring 24 force will push the valve 2 open and allow fuel to flow into high-pressure chamber 23.

A supply module 10 also fits within the low-pressure barrel 8. The supply module 10 has inlet openings 21 for fuel to pass, and also provides flow paths from a fluid inlet of the fuel injector into the low-pressure barrel 7, high-pressure barrel 9, needle barrel 3, and eventually high-pressure piston 6 and out of the nozzle 1. The high-pressure barrel 9 is disposed at least in a portion of the supply module 10. Finally, shuttle seal 15 is shown positioned between the low-pressure barrel 8 and shuttle 12 to provide a seal and tight connection between the two components when connected.

Now that many of the components have been identified, the applicant would like to refer now to FIGS. 19A-D which illustrate the various stages of one embodiment of a high-pressure injection fuel system, the components of which will be described in more detail hereafter.

Figure 19A:
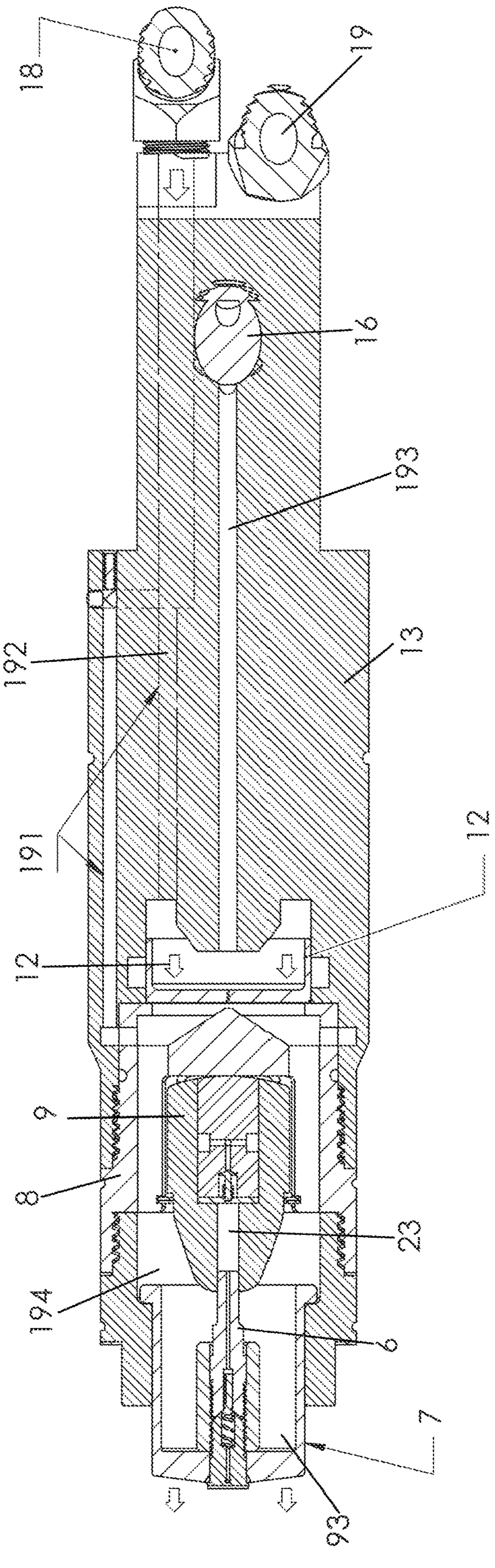
FIGS. 19A, 19B, 19C, and 19D illustrate the various stages of one embodiment of operation of a high-pressure injection fuel system.

FIG. 19A illustrates various actions occurring during Stage 1 of the fuel injector operation. The initial step involves activating a solenoid valve (not shown) which allows fuel to rapidly enter the fuel injector. There is a constant supply of fuel being pumped into the injection system by a supply pump. The pressure supplied is relatively low, such as between 50-100 psi. As fuel enters through the inlet port 18 it branches off from a main inlet channel into other channels 191, 192, which then fill and pressurize each cavity of the low-pressure chamber, including cavity 194 between the low pressure piston 7 and high pressure barrel 9. Shuttle 12 operation controls when the fluid fills and exits from the fuel injector. An internal spring pushes the shuttle 12 forward so the rapid fluid exit channels of the shuttle housing 13 that lead to outlet 19 become closed. The low-pressure piston 7 begins to extend as pressure increases from the fuel coming into the system.

Figure 19B:
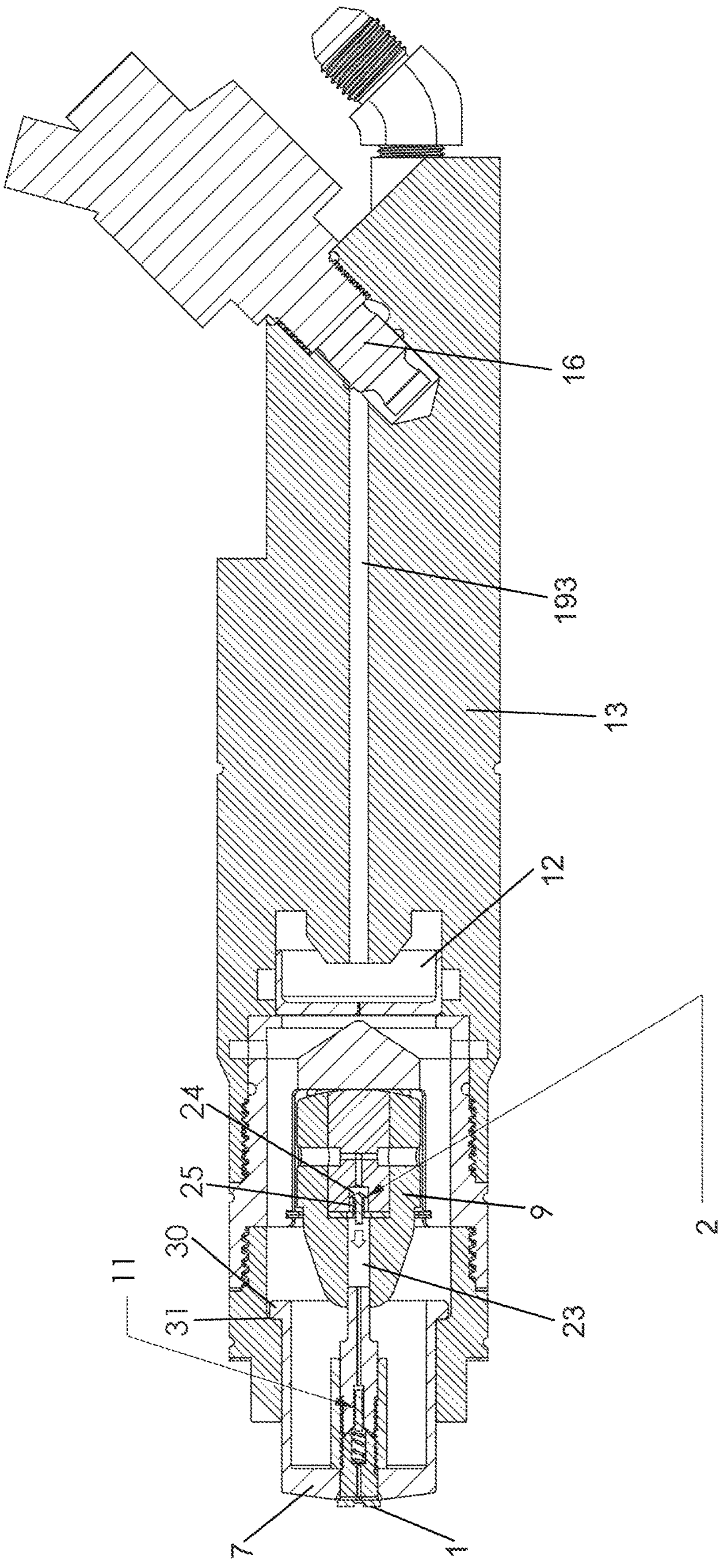

FIG. 19B illustrates stage 2 of the fuel injector operation. Fuel from the low-pressure barrel 8 flows through openings and enters into the high-pressure chamber 23 located within the high-pressure barrel 9 and formed on one end by the sliding high-pressure piston 6, past the shut-off valve 2, which is a one way valve. Increasing pressure forces the shut-off valve 2 open against force applied by spring 24 which fits into area 25, allowing fuel to enter the high-pressure chamber 23. As the high-pressure chamber 23 is filling, the volume displacement valve 11 of the high-pressure piston 6 remains closed until the low-pressure piston 7 begins to move. Again, the low-pressure piston begins to move due to pressure within the combustion chamber in which the fuel injector is positioned. The low-pressure piston 7, at stage 2, is extended to its maximum extended position and flange 30 abuts flange wall 31 of the low-pressure barrel 8 preventing the low-pressure piston 7 from extending any further. While not an action at this stage, a solenoid 16 communicates with path 193 which communicates with shuttle 12. Upon opening of solenoid 16, a fluid lock of fluid in path 193 against shuttle 12 allows the shuttle to move backwards and let fuel in the low-pressure barrel 8 exit the barrel via outlet path(s).

Figure 19C:
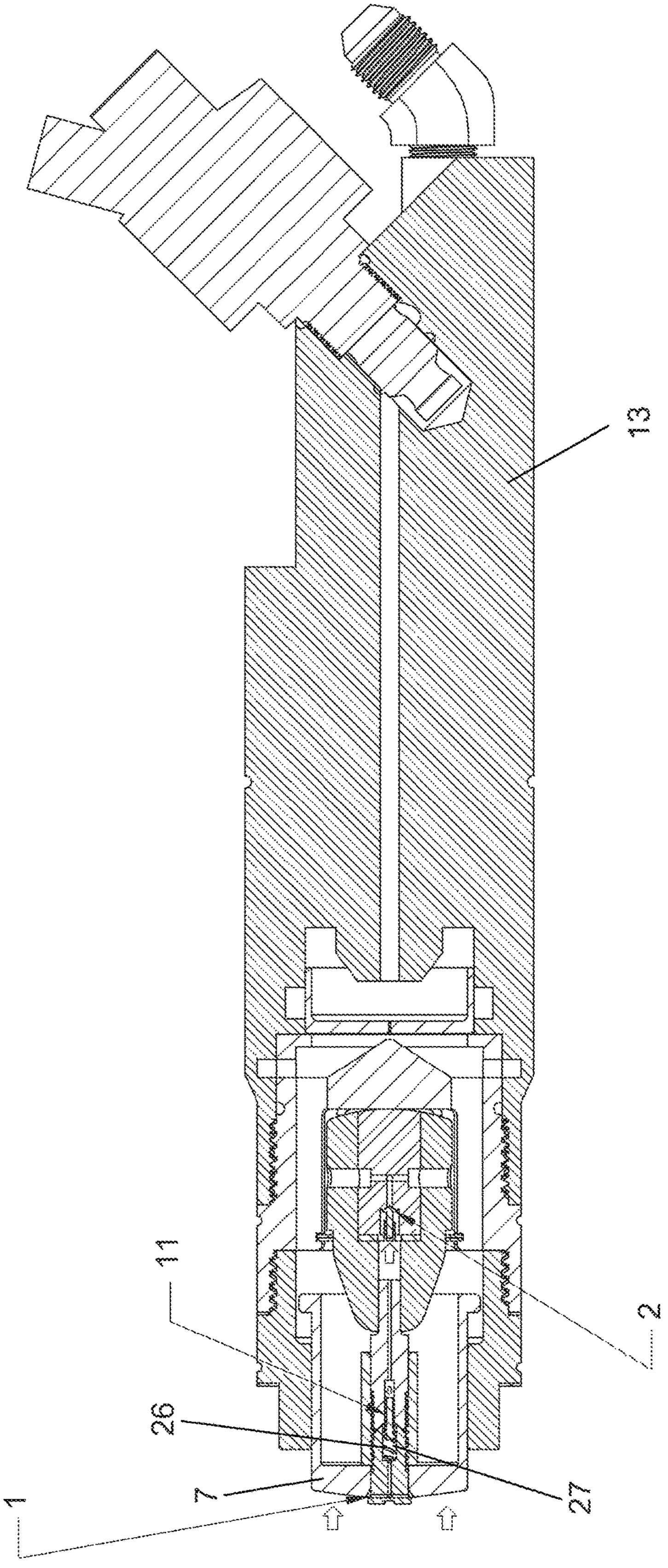

FIG. 19C illustrates stage 3, which conveys in that increasing pressure in the combustion chamber of the internal combustion engine, caused by a piston decreasing the volume of the combustion chamber, causes the low-pressure piston 7 to move inward into the low-pressure barrel 8.

Initially, increasing pressure in the high-pressure chamber 23 causes the shut-off valve to close. This is caused both by the decrease in pressure differential between the chamber 23 and fluid entering the high-pressure barrel 9, as well as by the increase in pressure in the chamber 23 caused by the inward motion of the high-pressure piston 6 (which, in this embodiment, moves directly correspondingly with the low-pressure piston 7 due to a fixed connection between the two). The retraction or initial force on the low pressure piston 7 is a result of compression build up in the combustion chamber (not shown) of the engine. This compression build-up forces the shut-off valve 2 closed and then allows the volume displacement valve 11 within the high-pressure piston 6 to open when pressure in the high-pressure chamber 23 increases sufficiently to overcome the spring force of spring 26 engaged with the valve 11. Opening of the volume displacement valve 11 then feeds an initial amount of fuel through the injection nozzle 1 into the combustion chamber. The high-pressure chamber 23 may feel a 50:1 pressure multiplier ratio in one embodiment, but can modified to be higher, including 70:1, 85:1, 100:1 or greater. The ratio is based on the outer face surface area of the low-pressure piston 7 to the inner face surface area of the end of the high-pressure piston 6 within the high-pressure chamber 23 defined by the high-pressure barrel 9. In other words, a front face surface area of the low-pressure piston is greater than a surface area of a face of the high-pressure piston that defines a fluid inlet opening. Thus, if the low-pressure piston feels 700 psi from the initial compression pressure, then a force of 35,000 psi is exerted by the end of the high-pressure piston, which forces the fuel out through the injection nozzle, which atomizes the fuel and begins combusting in the combustion chamber.

The combustion pressure created in the combustion chamber is usually greater than the original compression pressure, this then causes the remaining fuel to be forced through the injection nozzle at much higher pressures, which can be 80 ksi, 90 ksi, 100 ksi, or greater. This increased pressure causes the fuel to be atomized into even smaller particles, which then are able to completely combust and reduce significantly, if not all but eliminate, particulates being produced, as a result of the complete or near complete combustion.

For example, the compression pressure in many systems is around 750 psi, and if the pressure multiplier as noted above is 50:1, then the initial or first portion of the injection of fuel is being injected at a pressure of 750×50 or 37,500 psi. Once combustion occurs then that number can double, as the combustion pressure within the combustion chamber becomes around 1500 psi, resulting in the injection pressure being around 75,000 psi. With engines that include a turbo mechanism, which can further increase the combustion pressure to around 3000 psi, the resulting injection pressure for the final or second portion of the injected fuel can be upwards of 150,000 psi. Importantly, the maximum injection pressure is achievable on the first stroke due to the design and operation of the fuel injector.

The amount of fuel that is injected during the compression pressure phase can be in the range of 1-15%, while the remaining 85-99% of the fuel is fed into the combustion chamber during the combustion pressure phase. As noted in the advantages, the lower-pressure piston continues to be compressed while the combustion of fuel is occurring, which provides a continuous force on the fuel through the injection nozzle until the combustion is complete. This is advantageous, as the fuel supply into the combustion chamber lasts only as long as the combustion cycle occurs, as opposed to other systems that utilize springs and timing mechanisms to try to shut the fuel-off entering the combustion chamber. This eliminates that need for complex timing systems that can vary over time as the components operating them wear out.

Figure 19D:
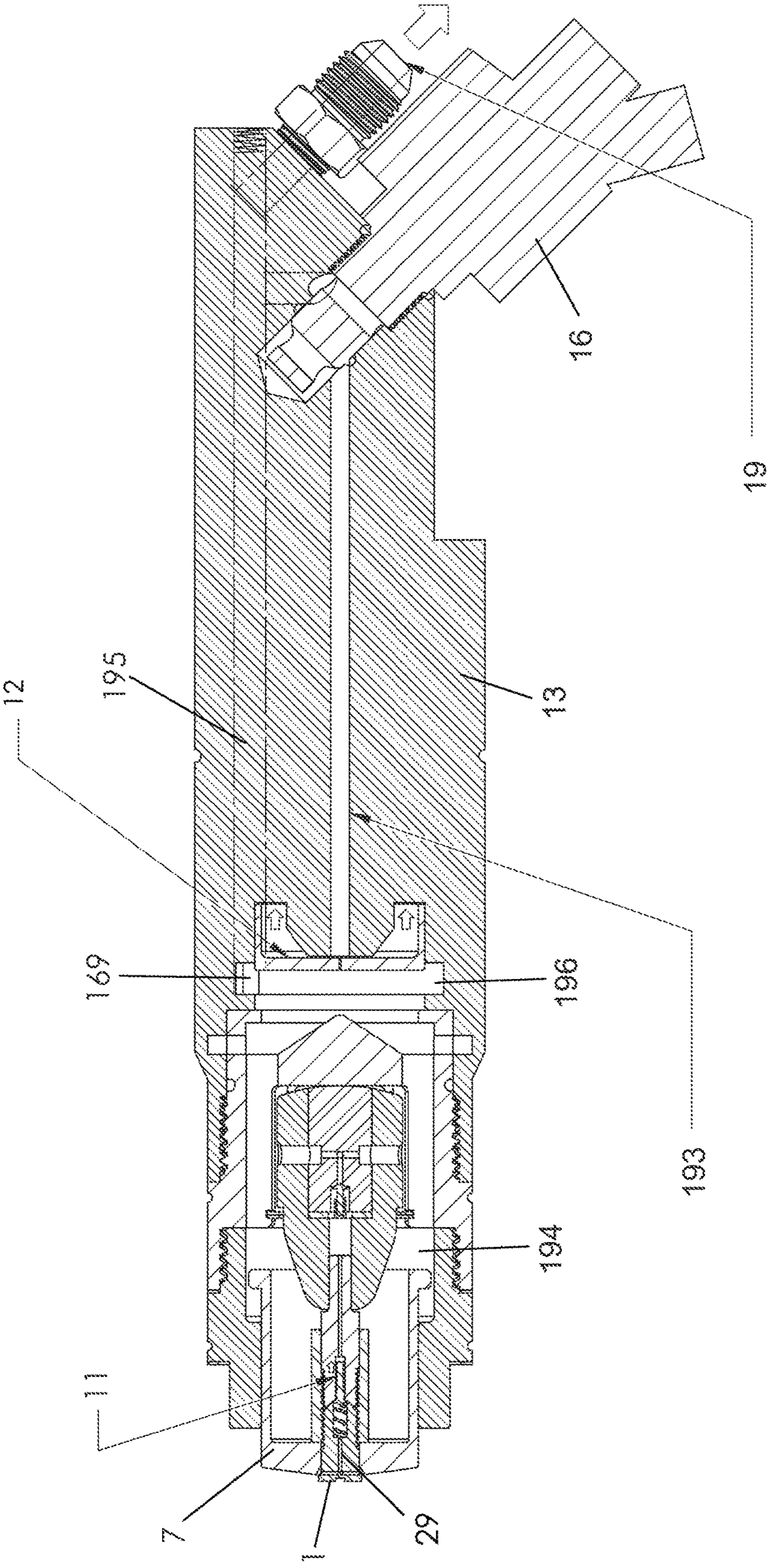

FIG. 19D illustrates stage 4, where once the low-pressure pistons 7 stops retracting (because combustion is complete), the volume displacement valve 11 retracts. This retraction causes the pressure in the outlet flow path 29 of the high-pressure piston 6 to drop, for example to drop to or near 0, which helps create a meniscus valve at the end of each of the tiny apertures of the injection nozzle. With such small diameters and no pressure, the sac volume fuel left cannot drip into the combustion chamber. Thus, eliminating large fuel drops that contribute to causing particulates through incomplete burning of prior art fuel injectors.

Next the outlet solenoid activates allowing pressurized fuel to exit first through the central passage 193 and to the outlet 19. This also releases a hydraulic lock on the shuttle 12, so the pressure buildup can force the shuttle 12 open to a plurality of channels 169, 195, 196 that lead to the outlet port 19, which fuel is then returned to the fuel tank. As fuel escapes through the central passage 193, pressure on the other side of the shuttle 12 overcomes the spring forcing the shuttle closed, and causes the shuttle to move backward to open the larger outlet passage via 169 and 196 to 195, until the pressure decreases and the shuttle moves back by spring force. Then, the cycle starts over again with the low pressure fuel pump filling the fuel injector and urging the low-pressure piston back to its extended position.

With this understanding of how the high-pressure fuel injection system operates, the applicant now refers to some of the individual components listed to further describe their purpose and further illustrate additional advantages and features of the high-pressure fuel injection system.

Figures 3A, 3B, 3C:
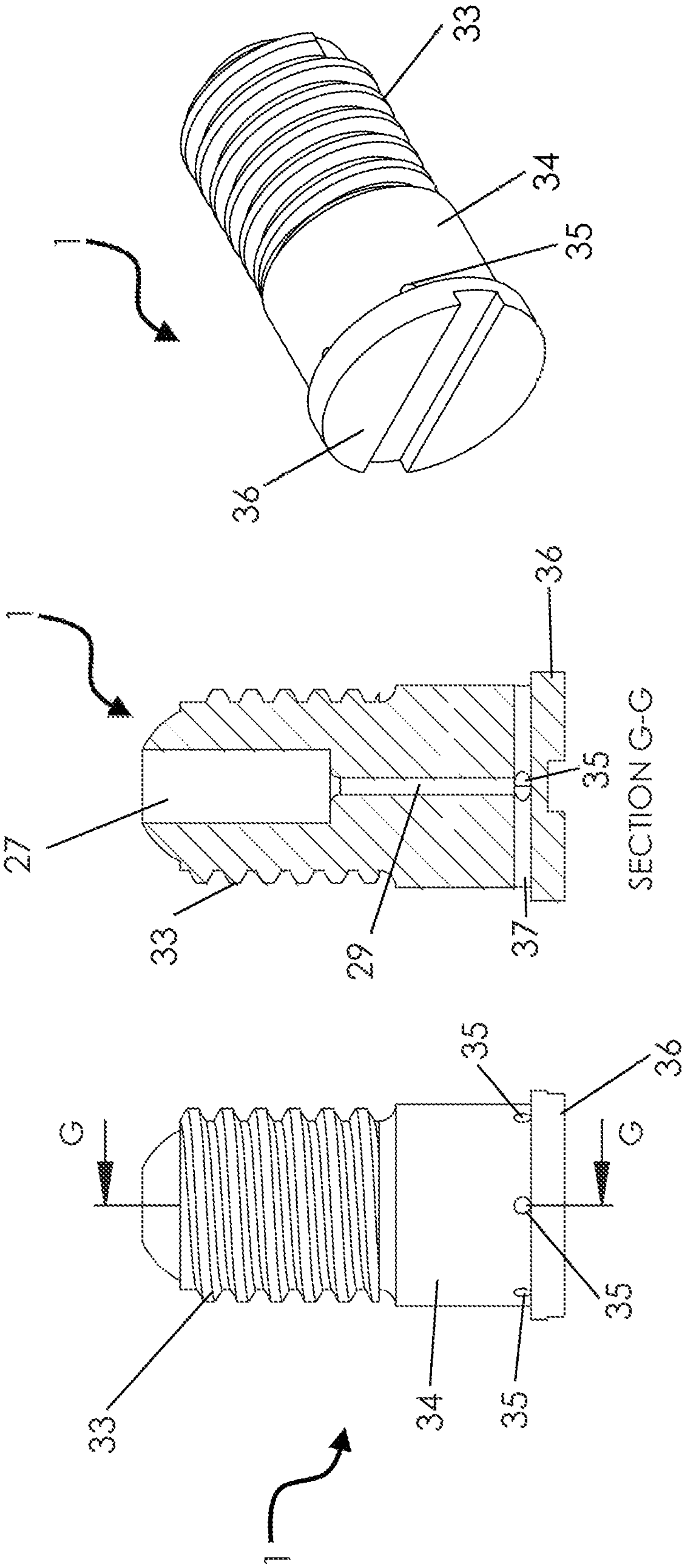
FIGS. 3A, 3B, and 3C illustrate various views of the isolated injection nozzle.
Figure 17D:
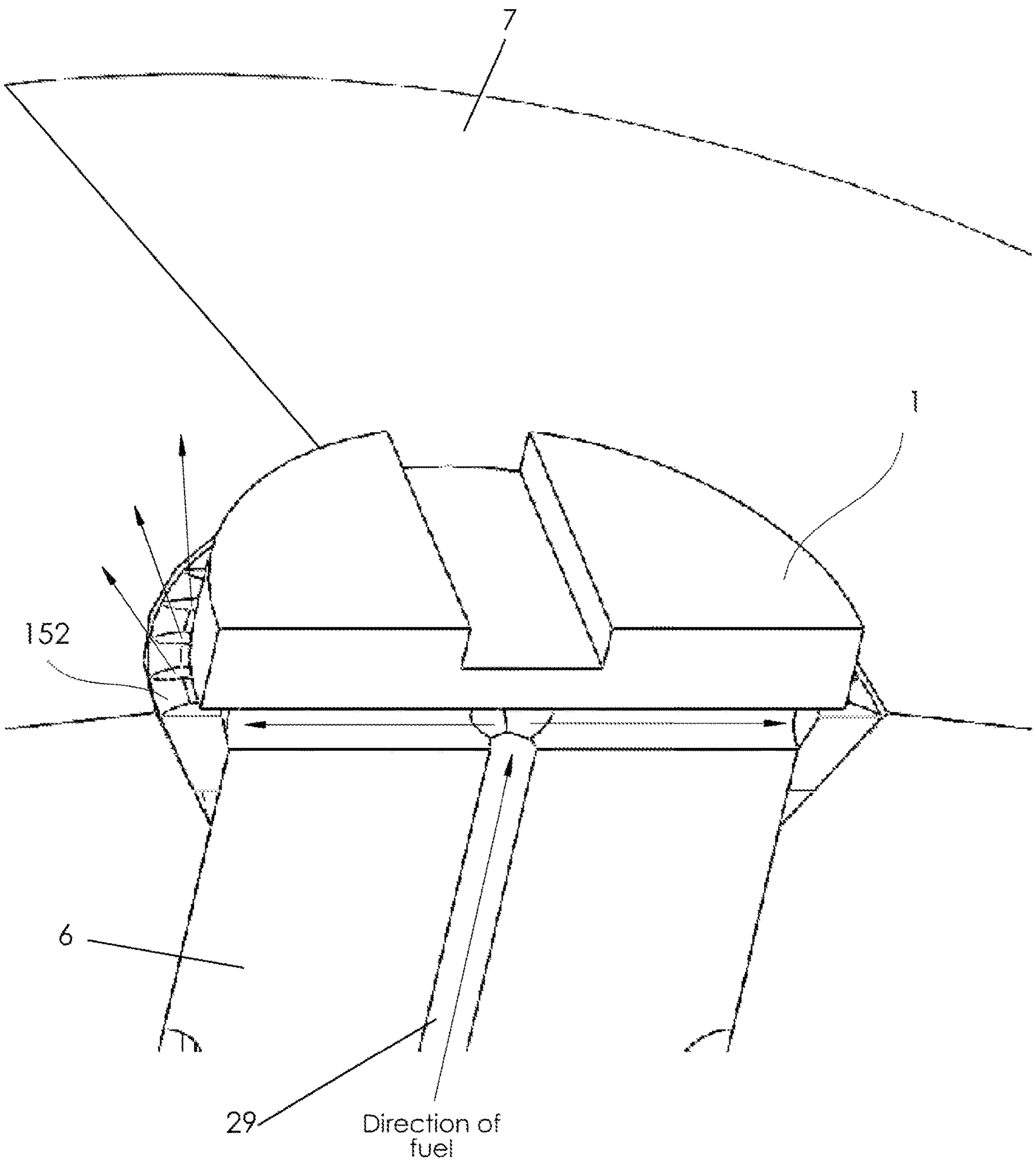
Figure 18A:
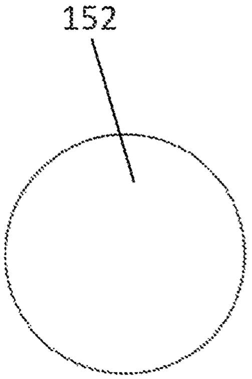
FIGS. 18A, 18B, 18C, and 18D illustrate various cross-sectional views of the apertures disposed about the perimeter of the injection nozzle.
Figure 18B:
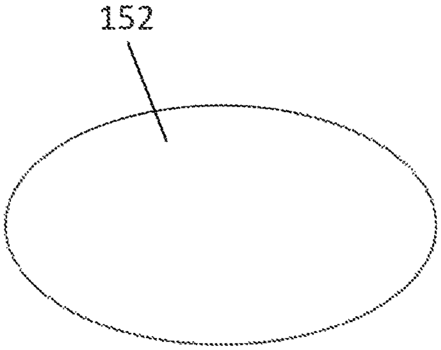
Figure 18C:
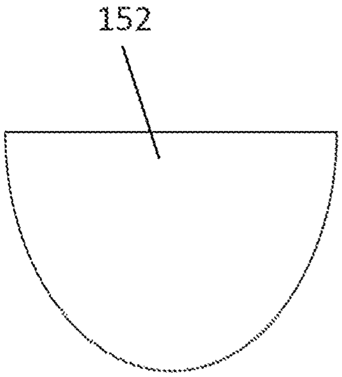
Figure 18D:
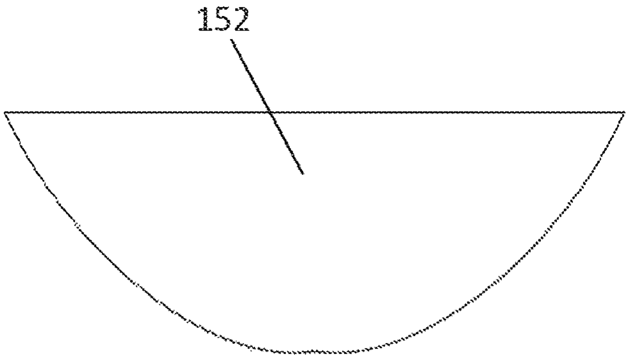

FIGS. 3A-C illustrate various views of the isolated injection nozzle 1. In the cross sectional view of FIG. 3B, it can be seen that a larger channel 27 in which a portion of the volume displacement valve (not shown) is held leads into a smaller channel 29 at the outlet of the nozzle 1. The smaller end channel 29 disperses to several radially oriented channels 35, 37, with respect to the smaller channel 29. These dispersion channels 35, 37 provide fuel about the annular perimeter of the injection nozzle 1, where fuel is forced through the apertures created by the nozzle ring (not shown, element 14 in other views) abutted about the injection nozzle, as best shown in FIG. 17D. As shown in side and perspective views of FIGS. 3A and 3C, the nozzle 1 has a head 36 which defines a slot to receive a screwdriver or other bit. A smooth middle portion 34 leads to a threaded rear portion 33. The threaded portion 33 connects to the nut 5 which also connects to the high-pressure piston 6 to join the two tightly together. Of course, other connection structures may be used, including an integral connection, without straying from the scope of this invention.

Figure 4B:
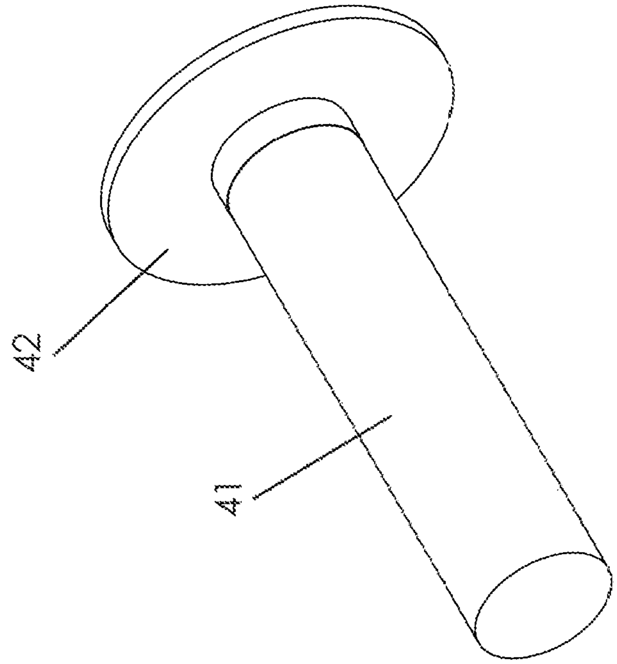
FIGS. 4A and 4B illustrate various views of the shut-off valve.
Figure 4A:
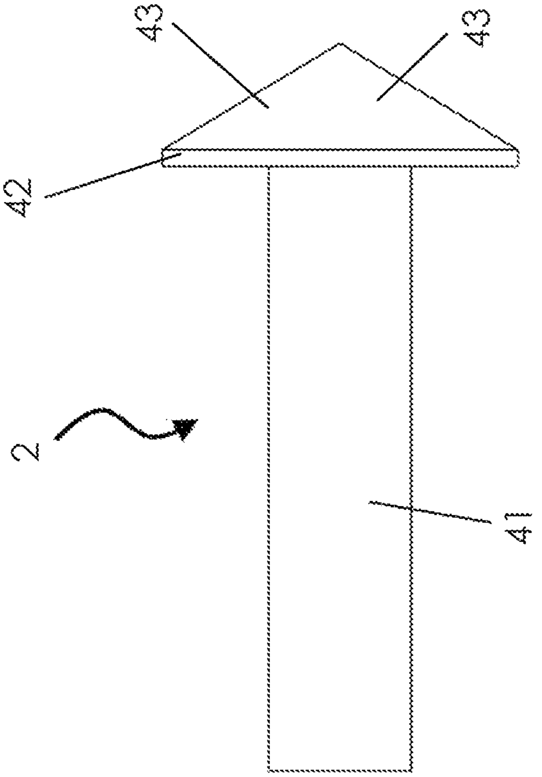
Figure 5D:
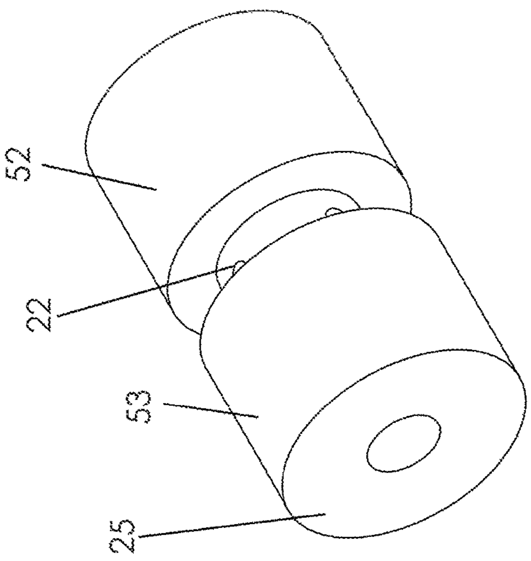
FIGS. 5A, 5B, 5C, and 5D illustrate various views of the needle barrel.
Figure 5C:
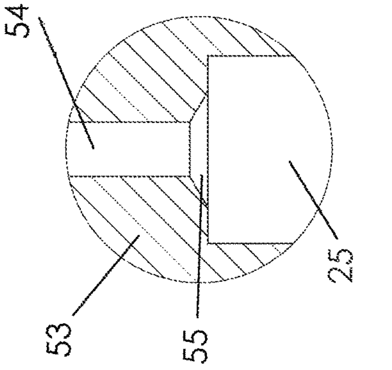
Figure 5B:
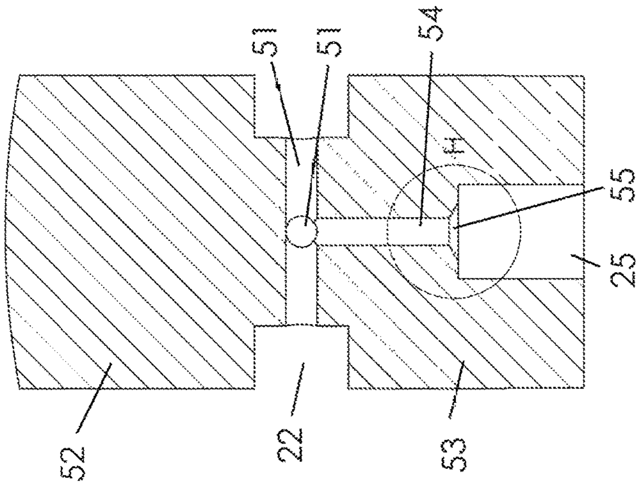
Figure 5A:
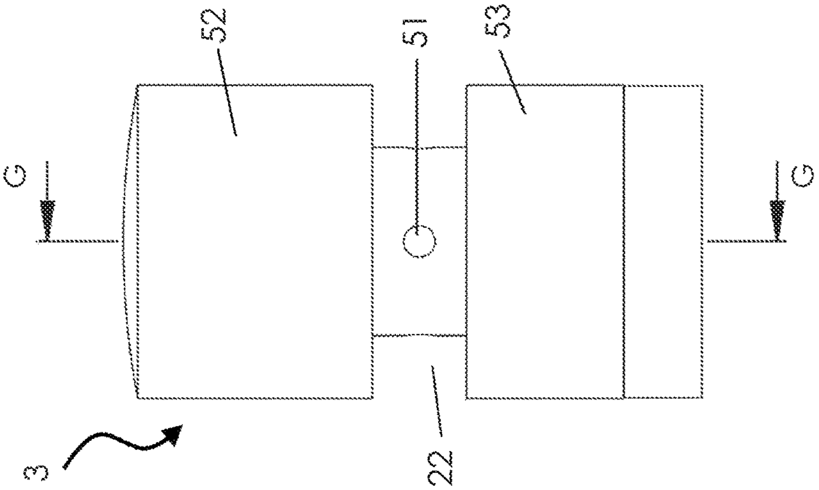

FIGS. 4A-B illustrate various views of the shut-off valve 2, which is located in the needle barrel 3 and acts as a one-way valve once the lower-pressure piston 7 begins to retract, so that the multiplier effect can occur and a high-pressure created to force the fuel in the high-pressure chamber out through the injection nozzle assembly. The valve 2 has a head portion 42 with a tapering forward cone 43, and a rear shaft 41 which can be slidably held in a needle retainer (See FIG. 6A-C) to allow for the valve to open and close.

FIGS. 5A-D illustrate various views of the needle barrel 3 as just noted, which resides within the high-pressure barrel 9 and includes an annular recess 22 that is configured to allow fuel entering the system to pass through holes 51 in the annular recess 22 past the shut-off valve and into the high-pressure chamber. The needle barrel 3 has two wide portions 52, 53 on each sides of the annular recess 22 which fit within the high-pressure barrel 9. The front wide portion 53 defines internal holes 51 which lead to flow path 54 and a tapering groove 55 which matches the conical shape 43 of the shut off valve 2 to allow for a tight seal between valve and barrel. A larger diameter section 25 fits a spring (24 as seen in FIG. 2B) as well as the shaft 41 of the shut off valve 2.

Figure 6B:
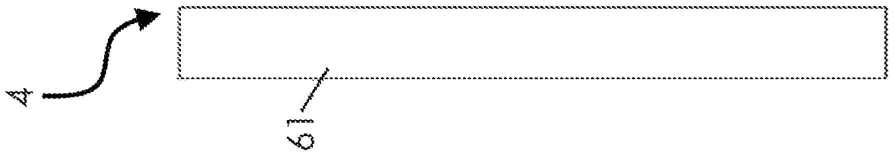
FIGS. 6A, 6B, and 6C illustrate various views of the needle retainer.
Figure 6A:
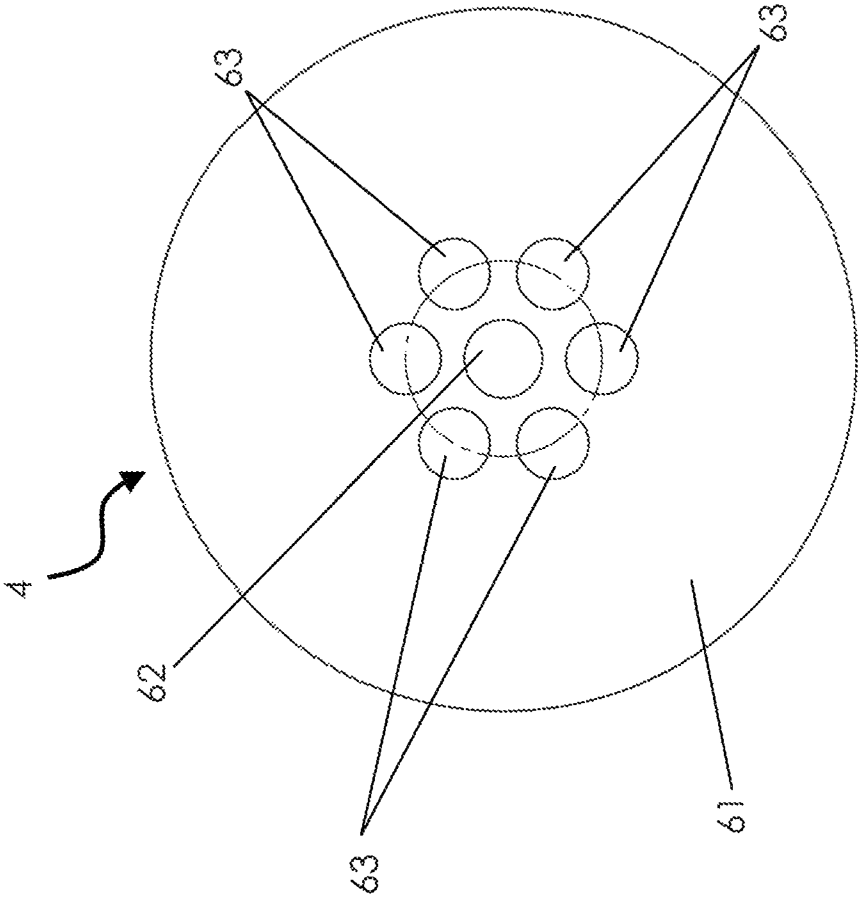
Figure 6C:
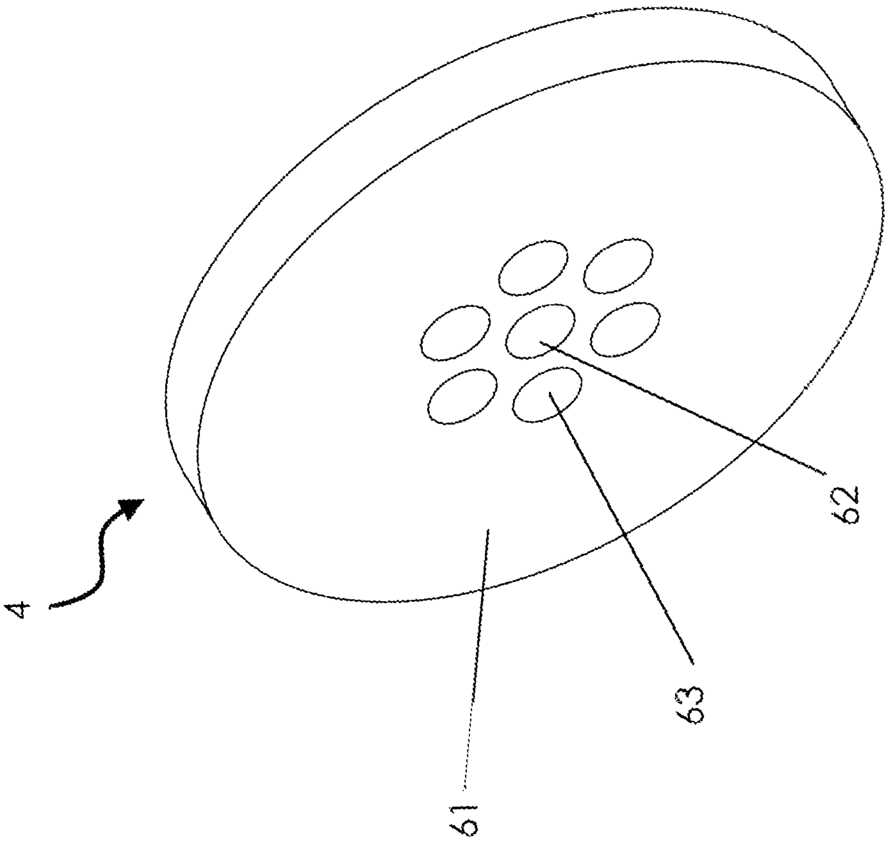
Figures 7A, 7B, 7C, 7D:
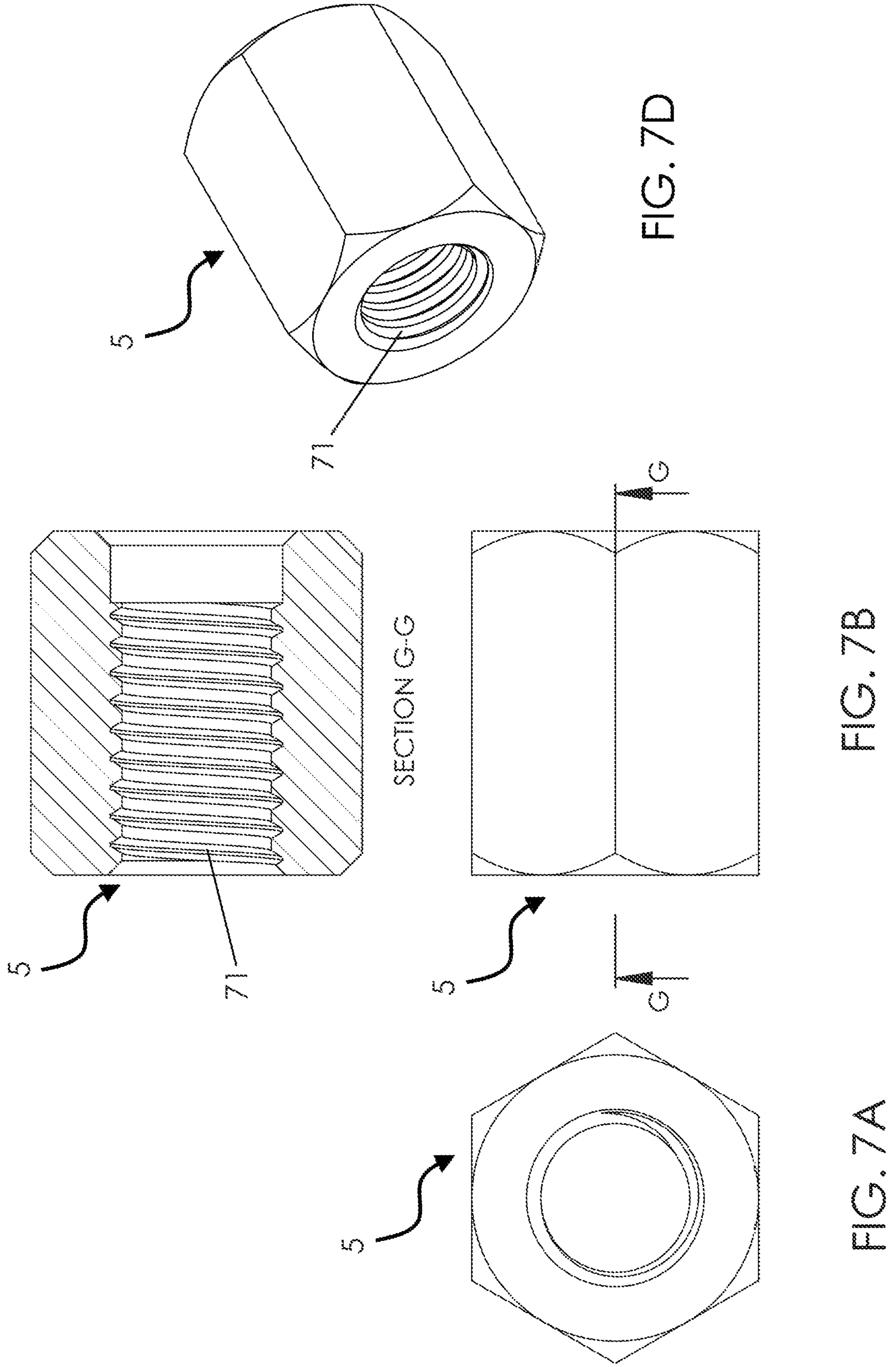
FIGS. 7A, 7B, 7C and 7D illustrate various views of the nozzle nut.
Figures 8A, 8B, 8C:
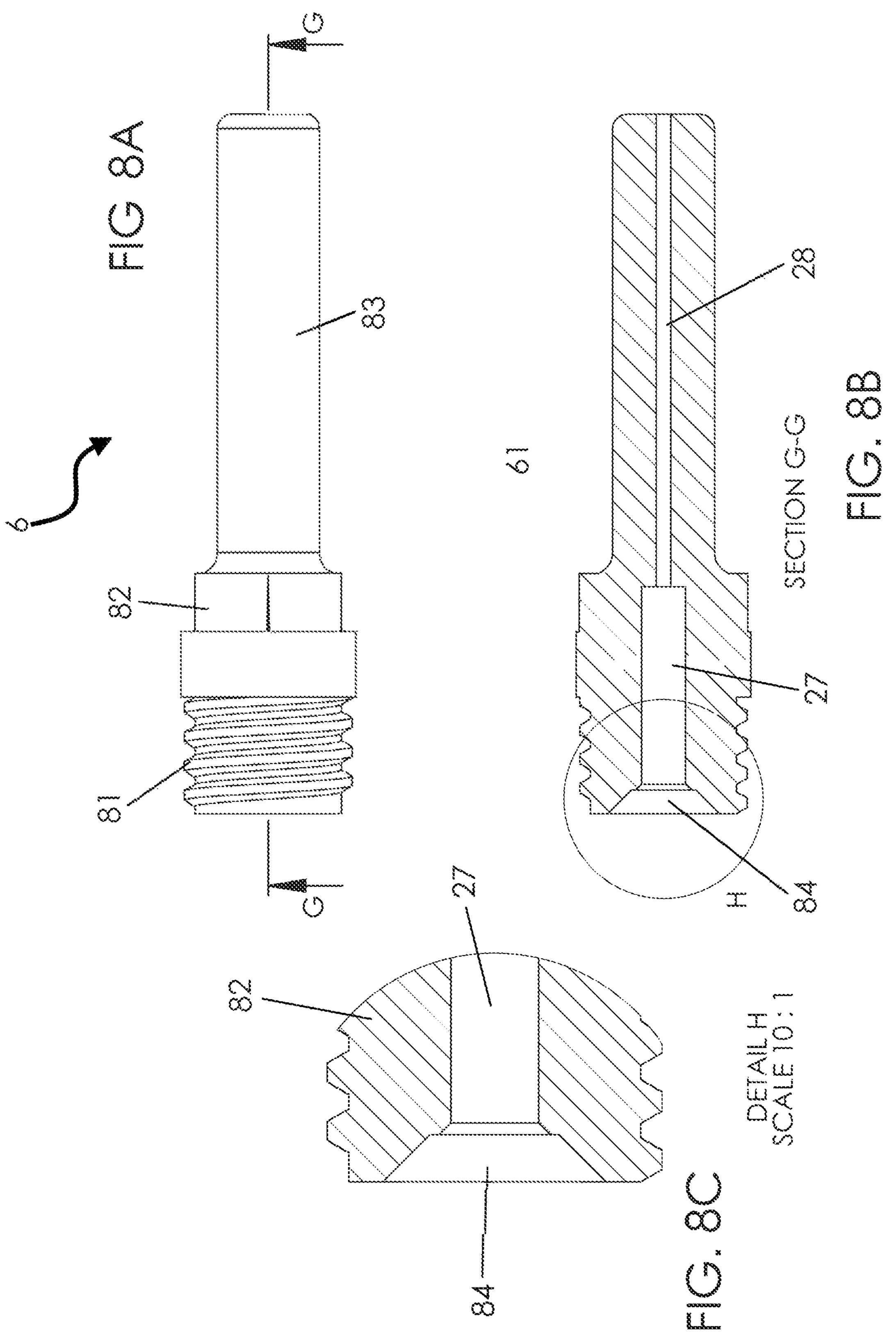
FIGS. 8A, 8B, 8C, and 8D illustrate various views of the high-pressure piston.
Figure 8D:
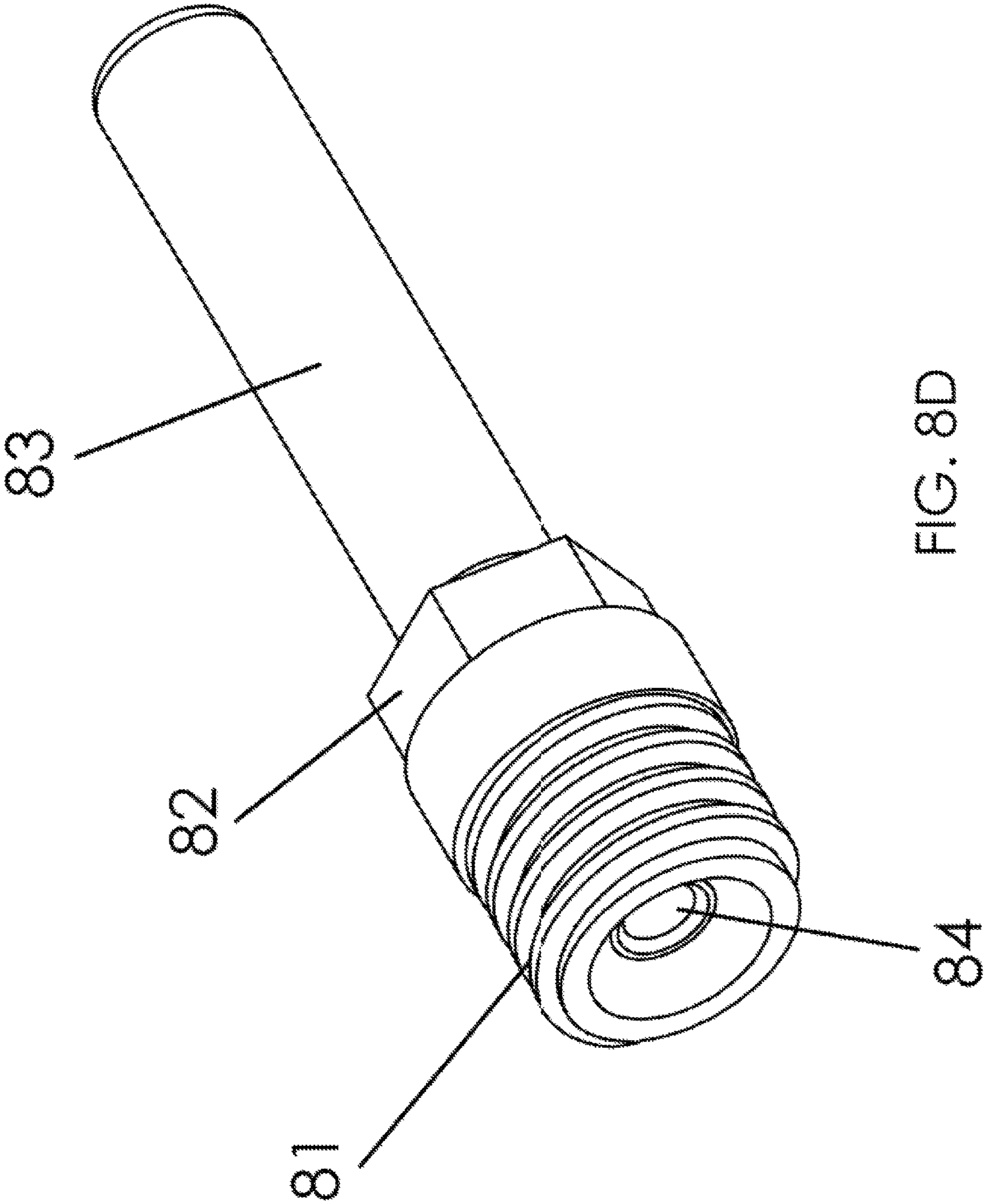

FIGS. 6A-C illustrate various views of the needle retainer 4. When assembled, as seen in, e.g. FIG. 2B the needle retainer 4 is disposed between one end of the needle barrel 3 and over an aperture in the high-pressure barrel 9 that leads in the high-pressure chamber 23 portion of the high-pressure barrel 9. The retainer 4 is formed of a body 61 which defines a central opening 62 into which the shaft 41 of the valve 2. Peripheral openings 63 allow fluid to flow through the wide diameter section 25 of the needle barrel 3 and into the high-pressure chamber 23.

FIGS. 7A-D illustrate various views of the nozzle nut 5, which secures the high-pressure piston to the injection nozzle. The high-pressure piston and the injection nozzle could be formed as a unitary, but are, in this embodiment, created separately for manufacturing purposes, which makes it easier to insert the volume displace valve between them. The nut 5 has a threaded interior 71 to receive corresponding threaded outer portions of the injection nozzle and high-pressure piston.

FIGS. 8A-D illustrate various views of the high-pressure piston 6. The high-pressure piston 6 abuts next to and is in fluid communication with the injection nozzle 1, and, at a distal end slidingly engages the high-pressure barrel. On a proximal end of the high-pressure piston, a flared opening 84 is formed where the complementary features of the volume displacement valve can close and form a seal against the flared opening 84. The proximal end also defines threads 81 and a hex perimeter 82 to allow for tightening into nut 5. A wider diameter portion 27 allows for a shaft of the volume displacement valve 11 to move. A narrow inlet channel 28 extends on the distal end 83 to an opening which communicates with the high-pressure chamber 23. The distal end 83 is formed as a shaft which is slidably fitted and held in the high pressure chamber 23 defined by the high-pressure barrel 9.

Figure 9C:
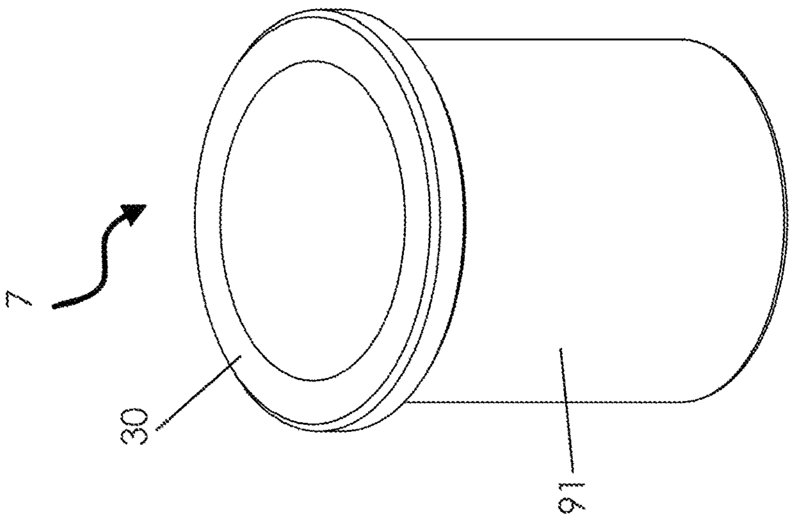
FIGS. 9A, 9B, and 9C illustrate various views of the low-pressure piston.
Figure 9B:
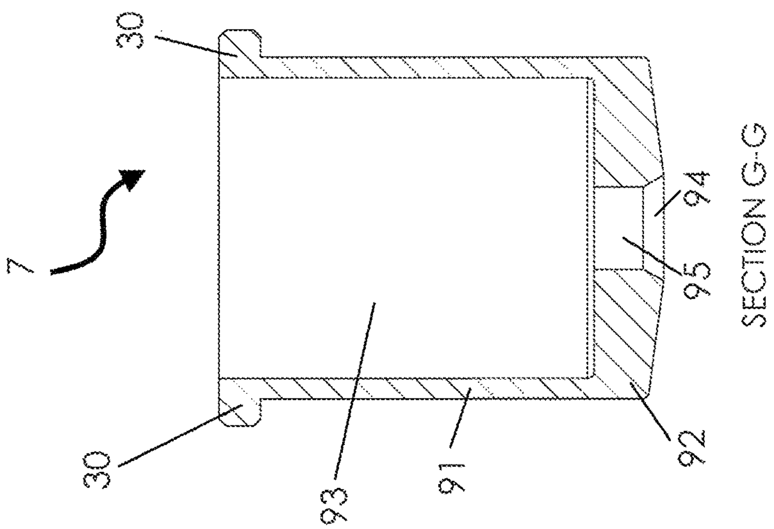
Figure 9A:
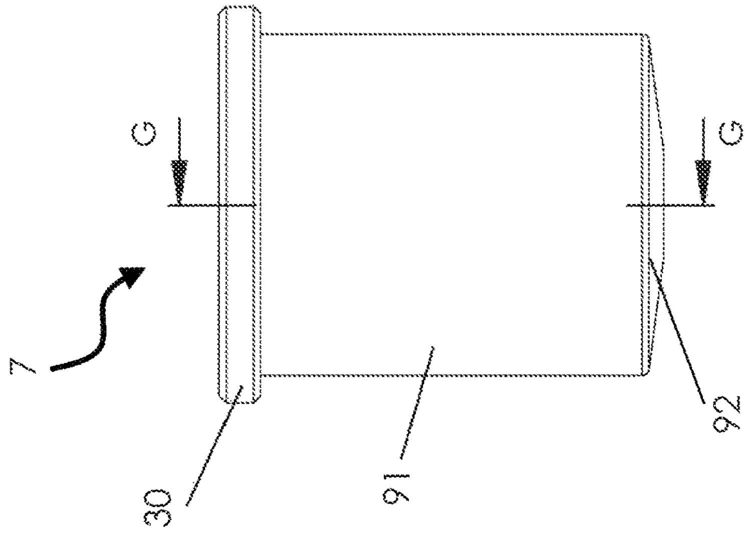

FIGS. 9A-C illustrate various views of the low-pressure piston 7. As noted above, the low-pressure piston 7 slides in and out relative to the low-pressure barrel 8 and in this embodiment, is directly affixed to the injection nozzle assembly 1. The fuel within the fuel injector components acts as lubricant and seals, thus eliminating the need for gaskets. The piston 7 has a front face 92 which defines a tapered opening 94 to match the shape of the nozzle ring 14, and also defines a central opening 95 through which the nozzle 1 passes to an interior volume 93 defined by the piston 7. The piston 7 has a sidewall 91 and flange 30 at its end which extends annularly outward to engage with the low-pressure barrel 8. This flange 30 acts as a seal to the interior of the low-pressure barrel 8 and also a stopper to abut a wall (31, FIG. 2B) to limit outward movement of the piston 7.

Figure 10C:
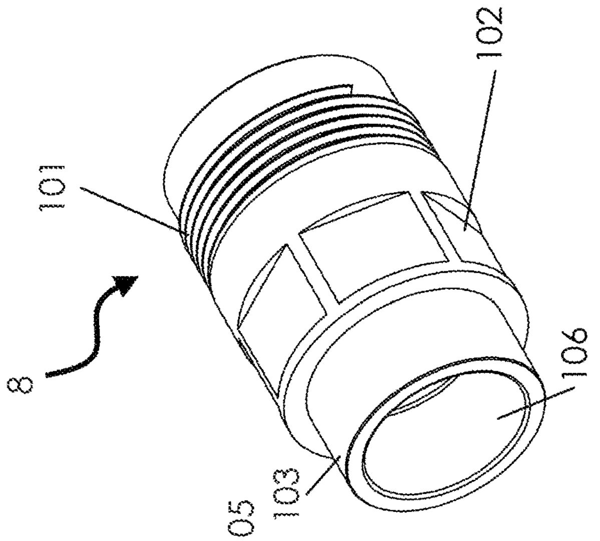
FIGS. 10A, 10B, and 10C illustrate various views of the low-pressure barrel.
Figure 10B:
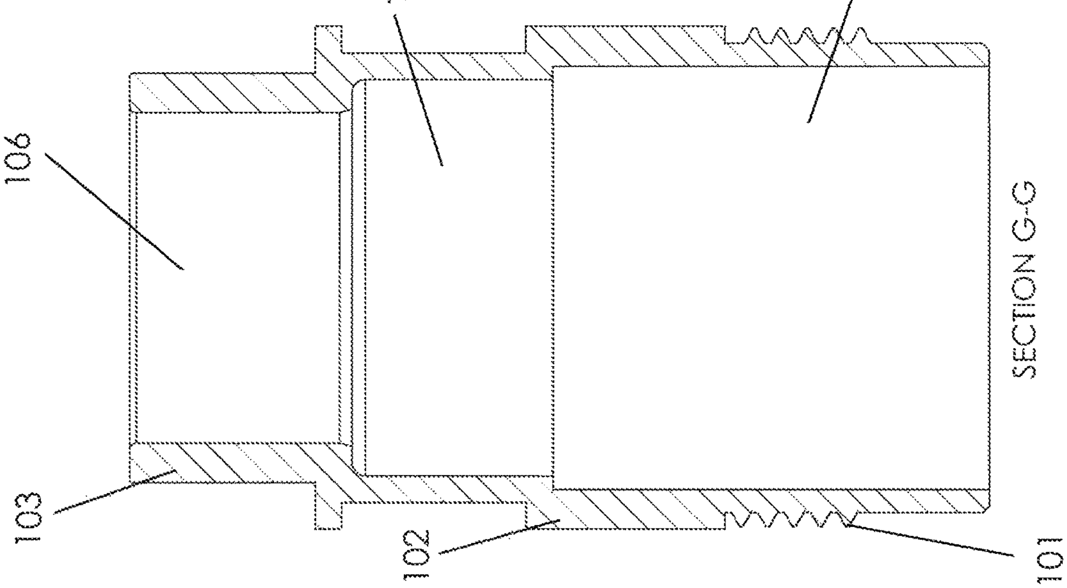
Figure 10A:
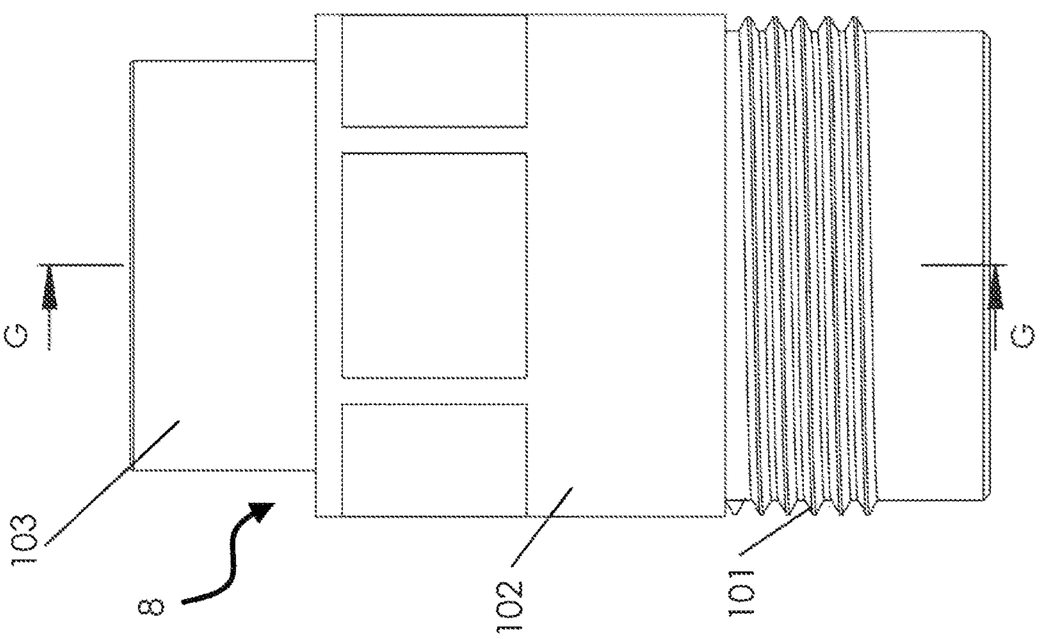

FIGS. 10A-C illustrate various views of the low-pressure barrel, just mentioned, which houses the low-pressure piston 7, high-pressure barrel 9 and is connected to the shuttle housing 13. The low-pressure barrel 8 defines a smooth front ring 103 that abuts the outside of the sidewall of the low-pressure piston 7. A central barrel portion 102 defines the interior section of the barrel into which components may fit at interior volumes 105 and 104. A rear part of the central barrel portion has threads 101 for connection to the shuttle housing 13, and a rear opening into which the shuttle 12 and shuttle seat 15 fit.

Figures 11A, 11B, 11C:
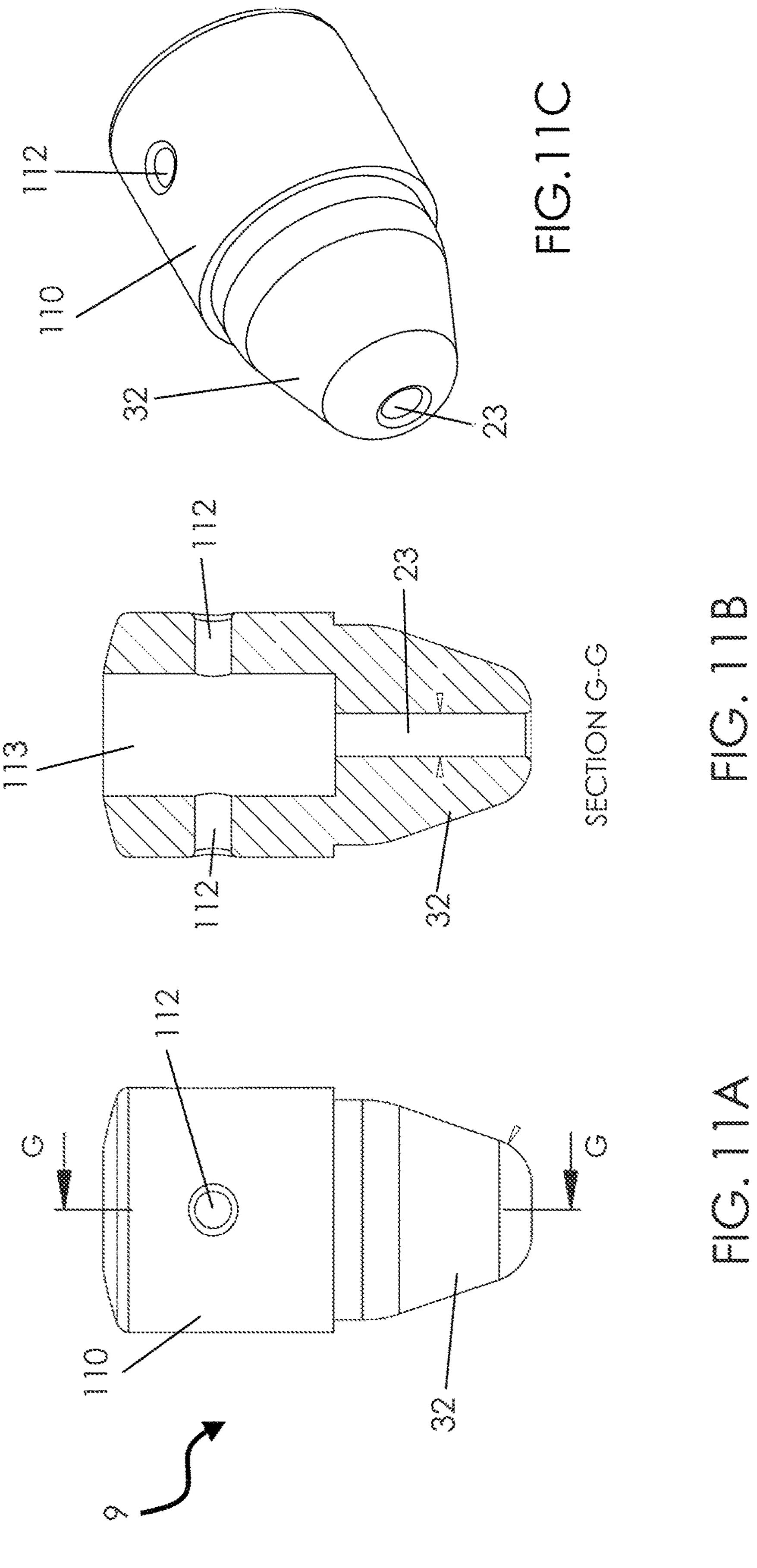
FIGS. 11A, 11B, and 11C illustrate various views of the high-pressure barrel.

FIGS. 11A-C illustrate various views of the high-pressure barrel 9. The high pressure barrel houses the needle barrel 3 at a distal end and forms the high-pressure chamber 23 at the proximal end. The high-pressure barrel 9 is formed of a body 110 with a tapering forward end 32. The body 110 also defines one or more inlets 112 into which fuel can flow. The opening 113 is sized to tightly fit the needle barrel 3 and the inlets 112 are positioned to align with the annular recession 22 in the needle barrel 3 which leads to the inlet of the high-pressure chamber 23.

Figure 12C:
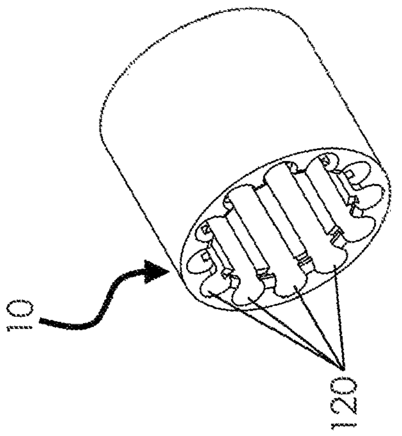
FIGS. 12A, 12B, and 12C illustrate various views of the supply module.
Figure 12B:
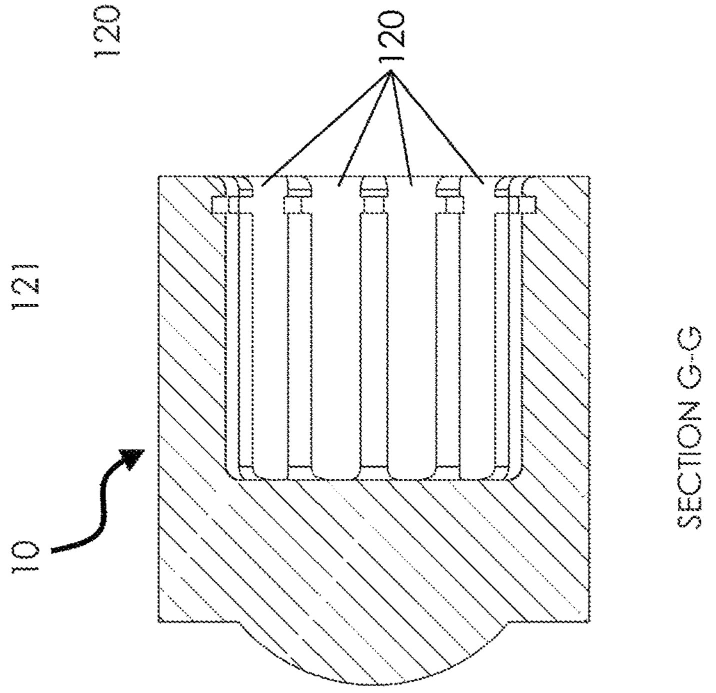
Figure 12A:
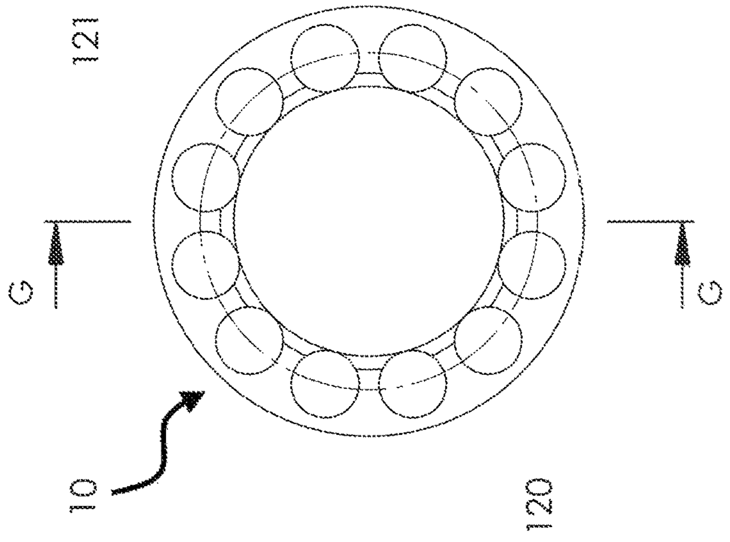

FIGS. 12A-C illustrate various views of the supply module 10, which is disposed about the high-pressure barrel 9 and helps channel fuel into the needle barrel. The supply module 10 fits within the low-pressure barrel 8 and defines a plurality of channels 120 that are in communication with the fuel inlet flow. These channels 120 also include a small notch to allow for annular flow between the different channels 120 which are formed into a sidewall 121. The supply module 10, in the embodiment shown, encourages even and uniform flow around the high-pressure barrel 9 for consistent pressure and inlet flow.

Figure 13C:
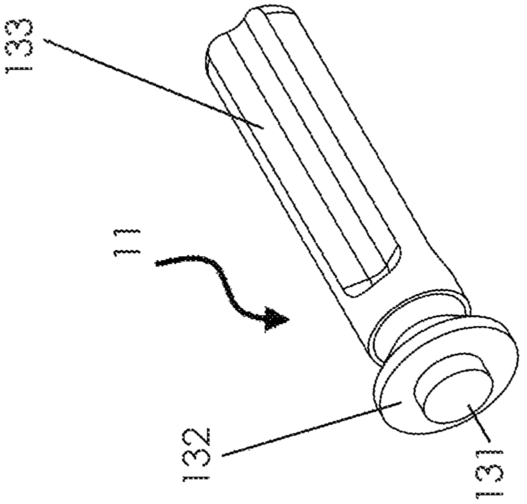
FIGS. 13A, 13B, and 13C illustrate various views of the volume displacement valve.
Figure 13B:
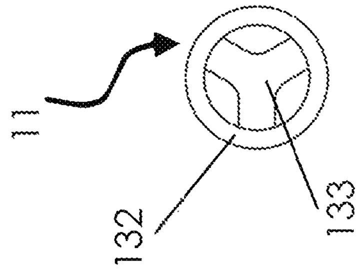
Figure 13A:
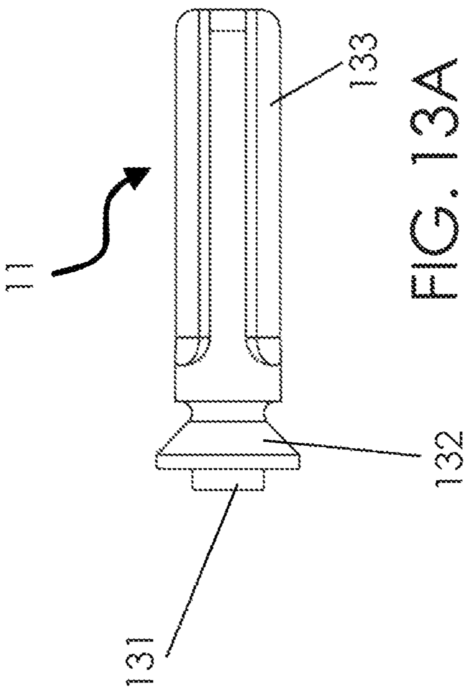

FIGS. 13A-C illustrate various views of the volume displacement valve 11 of the high-pressure piston 8. As previously noted, the valve 11 is disposed between the injection nozzle and the high-pressure piston inlet channel 28. On one end, the valve 11 has a complementary angled surface 132 that forms a seal with the high-pressure piston at 84, thus helping create a meniscus valve as previously described. The volume displacement valve 11 is operable to reduce the liquid dynamic wave caused by the fluid and movement, which in turn assists the meniscus liquid valve in its operation. A front end of the valve defines a spring holder 131 which receives spring 26 and biases the valve in a closed position with seat 132 abutting the high-pressure piston at 84. The distal end of the volume displacement valve 11 is formed as an elongated and flanged shaft. The shaft has multiple flanges 133 which define channels that fluid can flow along. These channels limit the distance that the valve 11 needs to travel forwardly against the spring force as urged by the pressurized fuel, bringing the fuel closer to the opening and allowing for faster action of the valve to open and close, increasing precision in the spraying of the fuel from the injector.

Figure 14C:
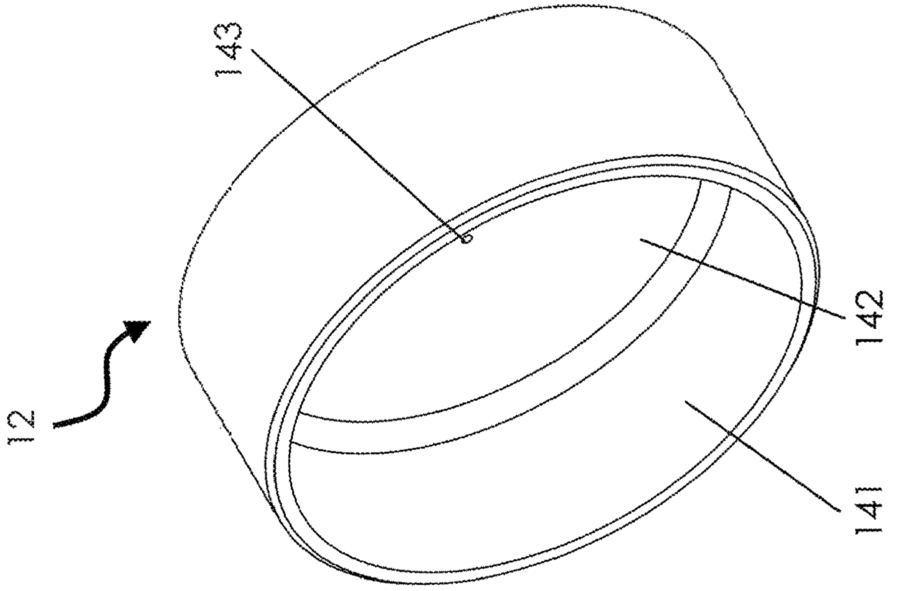
FIGS. 14A, 14B, and 14C illustrate various views of the shuttle.
Figure 14B:
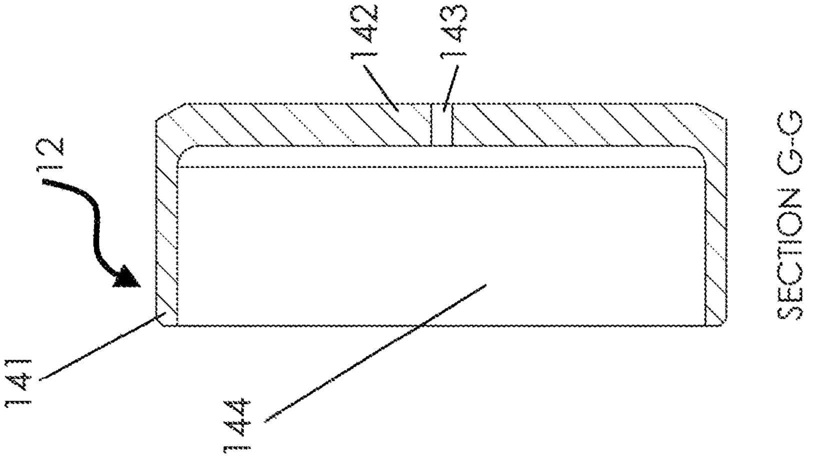
Figure 14A:
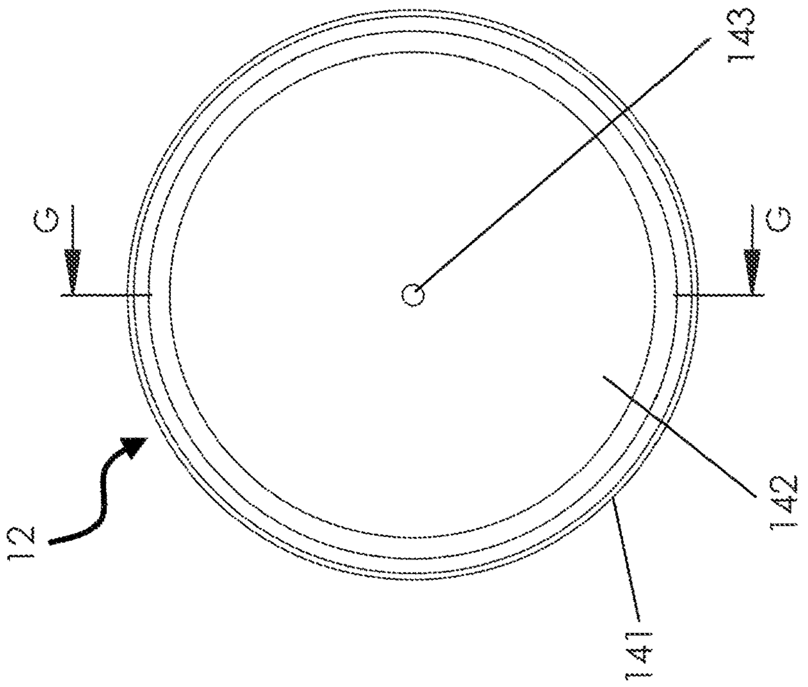

FIGS. 14A-C illustrate various views of the shuttle 12. As noted above, the shuttle 12 moves in and out to expose outlet channels when the solenoid is activated and releases a hydraulic lock. The shuttle 12 is defined generally as a cup shape having a base 142 and a sidewall 141. A hole 143 is formed at the center of the base through which fluid can flow. The shuttle 12 defines a volume 144 in the cup between the base 142 and sidewall 141.

Figure 15C:
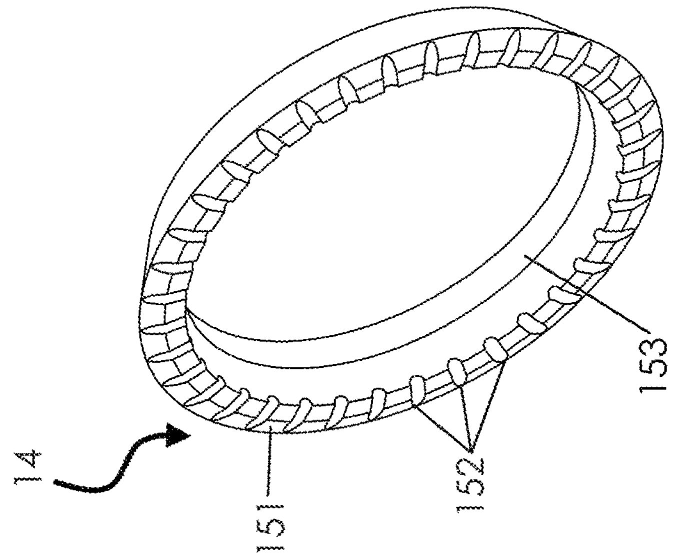
FIGS. 15A, 15B, and 15C illustrate various views of the nozzle ring.
Figure 15B:
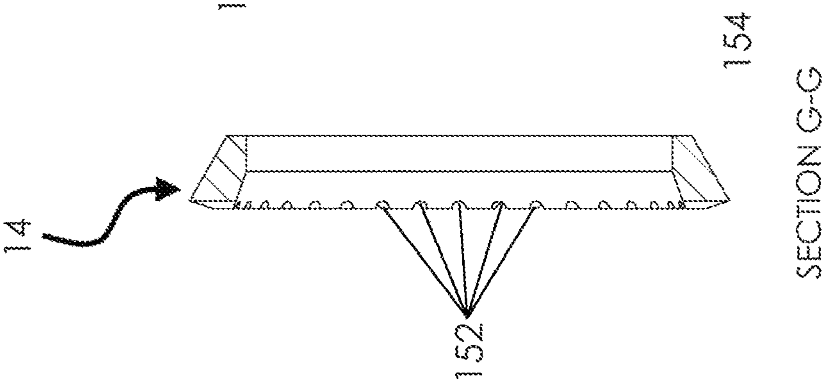
Figure 15A:
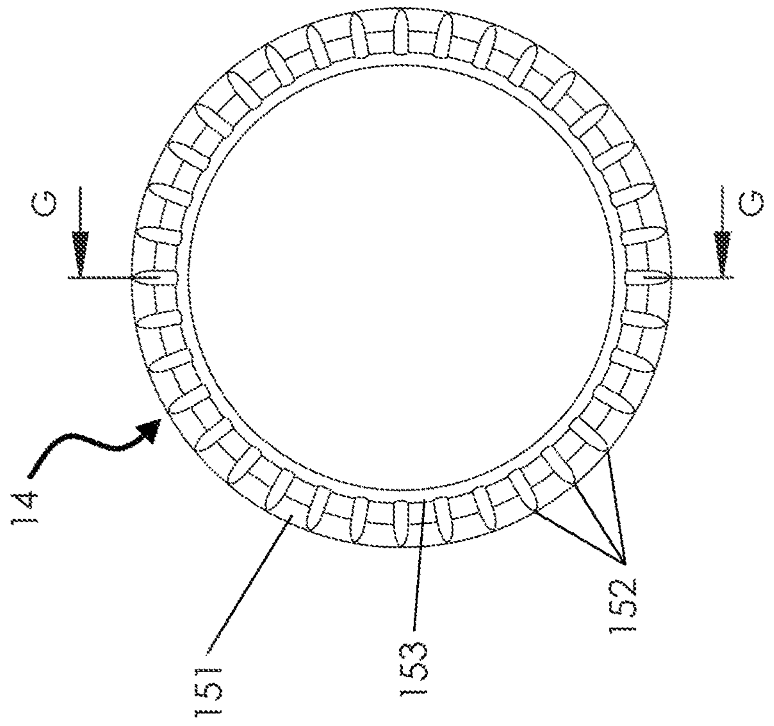

FIGS. 15A-C illustrate various views of the nozzle ring 14. The nozzle ring 14 is, in this embodiment, held to the low-pressure piston 7 outer face by the nozzle 1. The nozzle openings at 35, 37 etc disperse fluid around the annular edge 153 of the ring and the fuel is then sprayed out through orifices 152 formed in the surface 151 of the ring 14. The outer side 154 of the ring tapers inward and matches a tapered surface of an opening in the low-pressure piston 7 to ensure a flush connection. When the nozzle ring 14 is combined with the injection nozzle 1, an injection nozzle assembly is formed. Though in other embodiments, other structures such as an integral formation of the devices may be achieved without straying from the scope of this invention. Differently sized and shaped apertures 152 form the varied size aperture outlets where fuel passes through into the combustion chamber. Additional figures describe the advantages of varying the diameter and shape of these apertures.

Figure 16C:
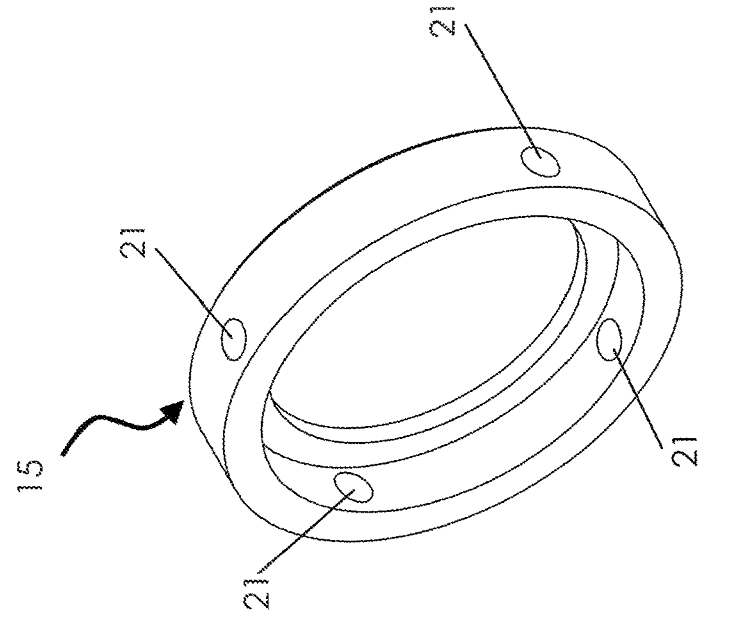
FIGS. 16A, 16B, and 16C illustrate various views of the shuttle seat.
Figure 16B:
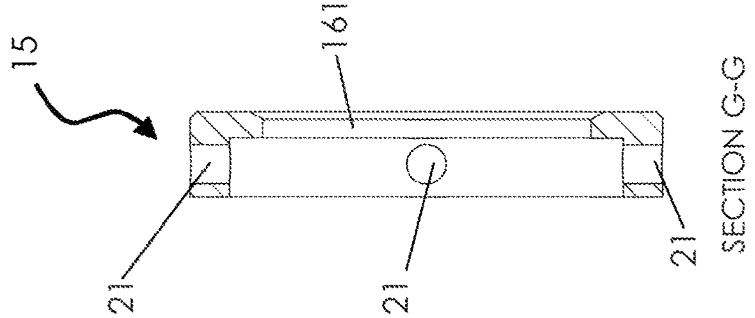
Figure 16A:
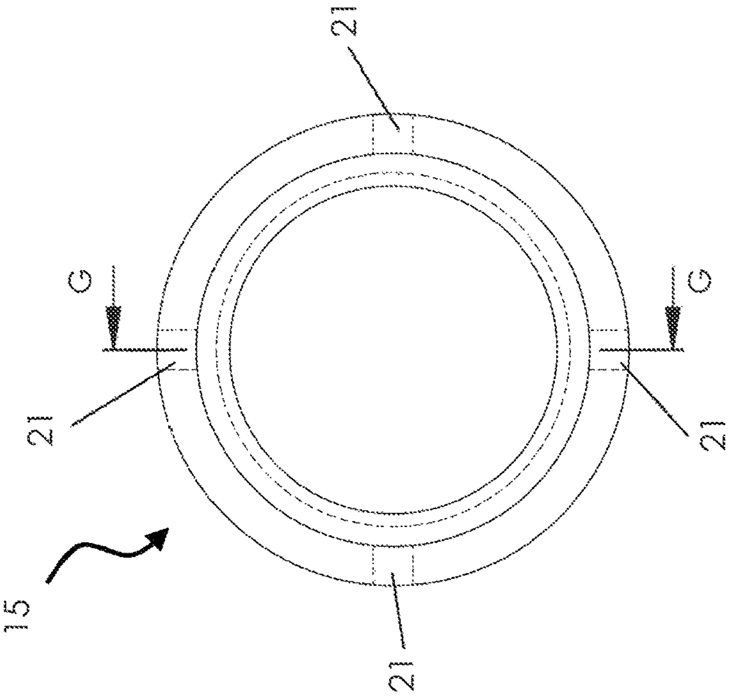

FIGS. 16A-C illustrate various views of the shuttle seat 15. The shuttle seat 15 is disposed in the shuttle housing near the shuttle 12 and has a base 161, along with inlet openings 21 for fuel to flow through.

FIGS. 17A-D illustrate various close-up views of the injection nozzle assembly and spray patterns resulting from the various-sized apertures as noted above. In particular, FIG. 17A illustrates close-up view of the nozzle ring 14 and injection nozzle 1, that form an injection nozzle assembly positioned at an outer part of the low-pressure piston 7. FIG. 17B illustrates an even closer view of the nozzle 1 and ring 14, and illustrates alternating diameters of the apertures as 152A, 152B, and 152C in a pattern about an annular perimeter of the nozzle ring 14 as noted above. FIG. 17C illustrates some of the target zones 170, 171, 172 to direct the atomized fuel for a more uniform combustion as noted above. FIG. 17D illustrates a cross-sectional, partial perspective view showing the fuel exit path through the injection nozzle assembly. Fluid flows forwardly through path 29 of the high-pressure piston 6 and then perpendicularly outward to outlets, and in turn through apertures 152.

FIGS. 18A-D illustrate various cross-sectional views of the apertures 152 disposed about the perimeter of the injection nozzle ring 14. As noted, each diameter can influence the size and direction of the fuel being ejected. A round, oval, D shaped, or more shallow curved aperture 152. Of course, other shapes and configurations may be used.

Figure 20:
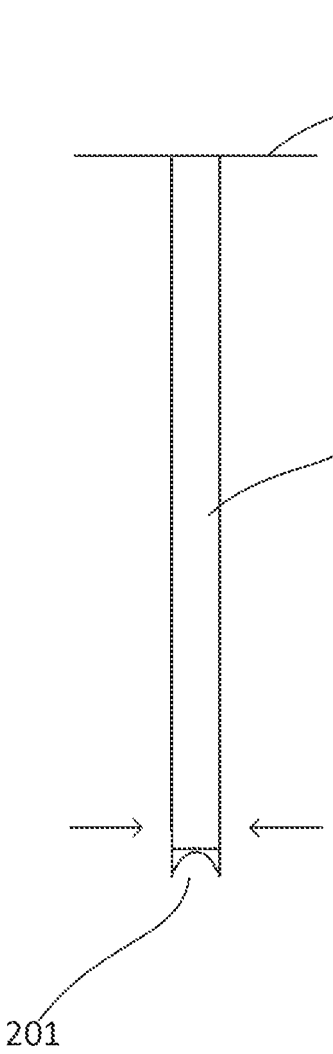
FIG. 20 illustrates a meniscus valve system used in the high-pressure injection fuel system.

FIG. 20 illustrates a meniscus valve system used in the high-pressure injection fuel system. By decreasing the diameter of the exit aperture 152 and the channel 29 leading to it, the surface to fluid ratio increases. The smaller the surface area, the greater the capillary or surface tension forces are applied to the remaining fluid in the channel 29 once one end of it is sealed off. The fluid 202 remaining generally forms a concave curve 201 near the exit end close to the aperture. Vacuum forces also contribute to keeping the closed off fuel inside each of the channels. Sealing structure 203 (such as volume displacement valve 11) prevents air or fluid entry into the channel 29, which might allow the fuel 202 to release.

Figure 21:
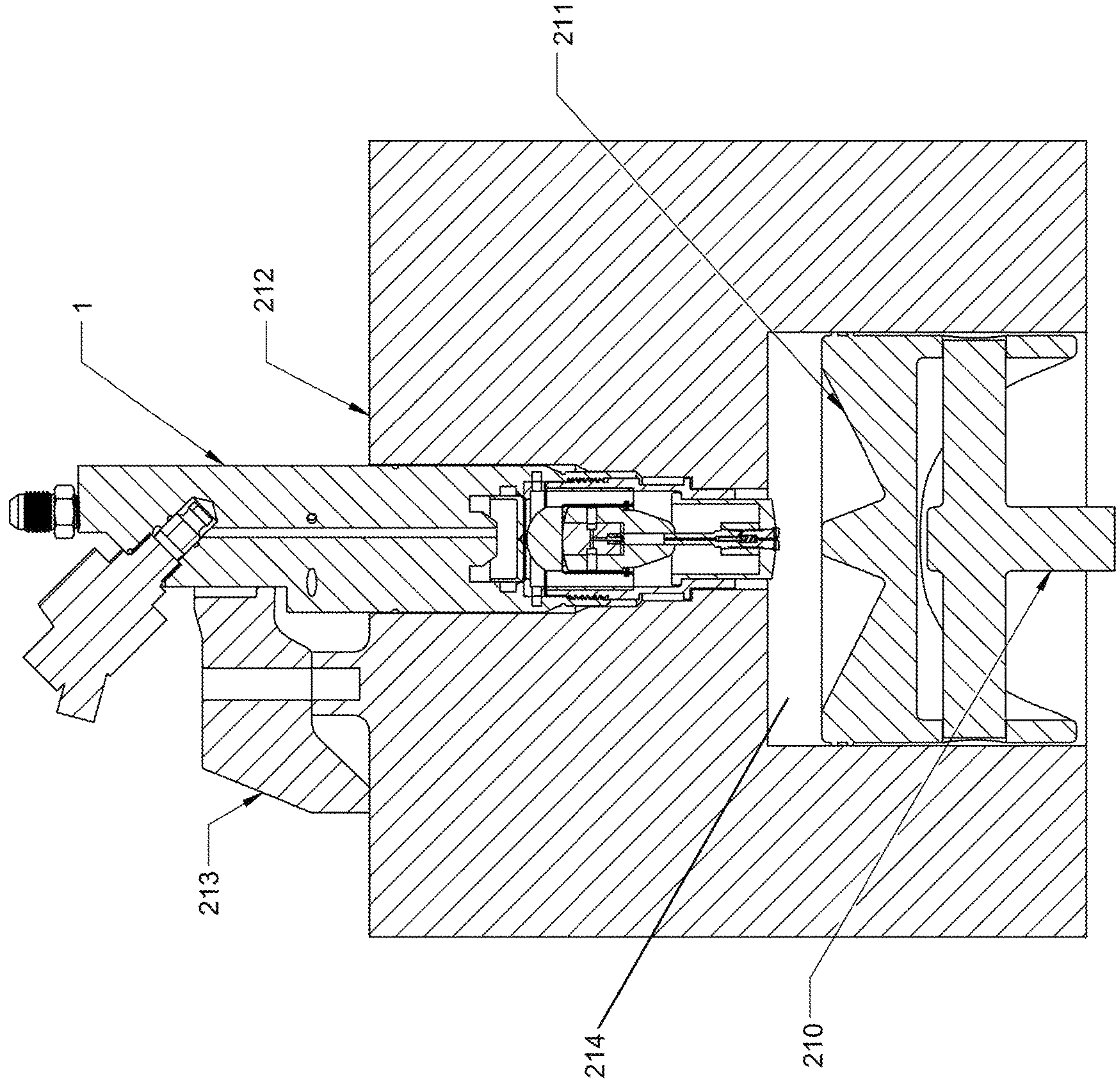
FIG. 21 provides a view of an embodiment of the fuel injector positioned in a cylinder which forms a combustion chamber with a piston.

FIG. 21 shows an embodiment of the fuel injector of the present disclosure installed in an engine. Fuel injector 1 is installed in the engine head 212 of an internal combustion engine with the nozzle within the cylinder combustion chamber 214. In this embodiment, an injector clamp 213 holds the fuel injector 1 in place. Piston 211 is within the combustion chamber 214 and moves vertically therein as known in the art. In this embodiment, the piston 211 is shown having a bowl, but as noted above, a flat cylinder may also be used due to the very fine atomization droplet size achieved by the fuel injector-leading to a more simple construction with a lower weight piston-improving efficiency. Piston 211 is connected to piston rod 210. In operation, as discussed herein, the fuel injection process begins by compressing a gas within a combustion chamber 214 of a combustion engine by conveying the piston 211 toward an end wall of the combustion chamber where the fuel injector 1 is located. This pressure causes a depressing of the low-pressure piston of the fuel injector 1 by the increase in pressure applying force to the low-pressure piston, thus causing it to move. The movement of the low-pressure piston causes a loading of the high-pressure chamber of the fuel injector with high pressure fuel. This high pressure fuel then overcomes a spring-loaded valve by its pressure within the high-pressure chamber. In turn, the fuel is sprayed out of a nozzle of the fuel injector 1 into the combustion chamber 214 and ignited.

It should also be noted that the systems and methods described above, also have the advantage of reducing or rather altogether eliminating swirl. Swirling the injected fuel is sometimes used in other injections systems. One of the problems with swirling injected fuel, and in particular larger size droplets of fuel, is that the swirling can actually prevent a complete burn of the droplet. The movement of the droplet means the flames are directed towards the back end of the droplet, which can prevent oxygen from entering or interacting with that portion of the droplet surface and thus result in an incomplete burn. Therefore, slower moving, non-swirling injected droplets of fuel are desired and created by the described systems and methods herein, helping contribute to a more complete burn or chemical reaction.

Another advantage of the precision of fuel entering and leaving the system is the use of solenoid valves to close off the fuel supply into the injection system. By using the solenoid valves effectively in reverse of traditional injector systems, the shut off time, can be reduce from around 8 milliseconds to under 1 millisecond. In reverse, the solenoid valve releases the ball valve, which quickly closes off the fuel supply. When operated the other way, the solenoid valve has to fight against pressure, which can delay the shutoff time. Faster shut-off times can help in a number of ways, including timing.

The fuel injector of the present invention provides a number of important improvements compared to the prior art. For example, in one embodiment, the injector low pressure control is designed to fit synchronous to combustion curve leading to no over-fueling. In other words, the injector may be configured such that the pressures within the injector and cylinder are related to ensure proper fuel distribution. Further a low-pressure release shuttle and low-pressure chamber are designed to evacuate so as to control and shape the combustion curve.

Depending on engine needs and configuration, the injection nozzle designed to spray through many different diameter openings, for example 6 to 10 variable diameters to provide many different droplet sizes, for example 6 to 10 different release droplet sizes.

Further, as noted above, the sac volume is eliminated from the tip due to the tip design and action of the fluid valve meniscus. The Meniscus valve has no metal moving components, which limits wear and tear and chance of failure. The internal three stage volume reducing action discussed above works in conjunction with meniscus valve to ensure elimination of sac volume.

The precise combustion control provided by the fuel injector and the optimal droplet sizing that can be achieved eliminates diesel knock. This allows light construction diesel engines that are comparable to petrol motor construction.

Importantly, the inventive fuel injector of the present disclosure allows for the removal of a number of elements required in other engines. For example, the approach used to generate the high-pressure supply does not require a high-pressure supply pump. Therefore, this high-pressure supply pump (used in CRDI systems) can be removed in engines using the inventive fuel injector system. Only a low-pressure fuel pump is needed and engines using the presently disclosed fuel injector can operate with no high-pressure supply pump.

Moreover, the nature of the actuation of the present fuel injector allows it to operate without cam operated tappets, as are required in other engines. The tappets consume internal energy, and therefore reduce overall efficiency. An engine using the fuel injectors disclosed herein can operate without cam operated tappets.

Further still, due to the very fine droplets achieved by the high pressure spray of the present fuel injectors, the combustion process is more efficient and controlled. Further, the uniform and fine spray patterns achieved reduce turbulence of combustion for more efficient and clean complete combustion. Reduced turbulence also results in lower stresses applied to the cylinder combustion chamber and components therein, and allows for a quieter engine operation. These enhancements therefore allow for a lighter, flat top piston to be used compared to the more heavy-duty pistons required in the prior art. This is because, among other reasons, the fuel injector provides for very good air and fuel mixing due to the spray location control and small droplet size. Therefore, the bowl shaped pistons of the prior art which facilitate the fuel-air mixing are not needed. Flat, lighter pistons move more readily, and therefore improve efficiency.

Another result of the improved combustion efficiency discussed throughout is that there is a reduction or elimination of radiant heat transfer due to the improved efficiency. This causes a reduced combustion temperature and in turn substantially reduces or eliminates nitrous oxide ("NOx") formation and particulate formation. The clear flame of the complete burn made possible by the extremely small droplet sizes provided by the present fuel injector cause a lower temperature and limit radiated heat. Indeed, the primary mode of heat transfer is via convection, rather than radiation (as in prior art engines). This lowers the combustion temperature, and in turn lowers NOx production. By contrast, burns of prior art engines are incomplete due to the larger droplet size (among other shortcomings) and produce high amounts of radiated heat, generating NOx particles and particulates. In addition, as the low pressure piston moves during the firing stroke, the cylinder combustion chamber compression reduces due to the increased volume provided by the low pressure piston movement. This in turn reduces NOx formation.

In operation, the low-pressure pump connected to the fuel injector is necessarily bypassed during the firing stroke as the high-pressure fuel is injected into the cylinder. This in fact aids in providing a high injection pressure.

The fuel injector of the present disclosure utilizes free-floating components to eliminate binding. Further, sealing in high pressure areas may be achieved by hemispherical-to-flat surface interfaces which eliminates gaskets. Preferably, no gaskets are used in the assembly. This eliminates changes in timing caused by the compression of soft gaskets.

The fuel injector of the present disclosure provides a longer burning curve due to the mode of injection and configuration. The longer burning curve results in increased torque, and can provide for more efficient gearing on a vehicle transmission.

The ultra-fine fuel droplets provided by the fuel injector of this disclosure, as discussed throughout, may eliminate the need for cold start devices and enables a wide variety of fuels to be used. As noted above, fuel droplets may be very small, less than 20 microns in diameter, resulting in better dispersion within the combustion chamber compared to the prior art. Thus, less fuel is needed for the same power, again leading to better efficiency. In one embodiment, the injector may use openings with a D-shaped cross section, which results in even better dispersion and in turn, better efficiency.

The fuel injection nozzles of the fuel injector are able to be extremely precisely sized and shaped to allow for customization of specific engine needs. For example, in one embodiment, the nozzle holes may be formed by two stage machining, using grinding for the final size to allow for nozzle size control as low as a quarter micron.

As can be seen in the figures above, the fuel injector is designed with several features and structures that use the fuel and injector in combination to improve performance. For example, the fuel injector is equipped with an automatic bypass to the pump fuel supply, allowing fluid to exit to the tank upon receipt of a rising pressure within the injector. Further, the injector is internally cooled by the fluid flow from within. This fuel which has absorbed some heat from the injector and any excess fuel then flows back to the tank, warming the tank volume and enabling easy and reliable engine starts in cool climates. Further, the low-pressure piston is cooled by the internal fuel volume and is also self-cleaned by its reciprocating action. The high-pressure piston has an automatic spill port to stop injection.

In certain embodiments, the fuel injectors may allow for "dieseling" (i.e. self-ignition) of fuels which are not typically used in self-igniting engines. This is due to the extremely small droplet sizes made possible by the nozzle and very high-pressure spraying. For example, the fuel injectors may be configured to diesel Hydrogen, even in a low compression 28:1 mode. In such an embodiment, the motor may be modified to accept inputs from Temperature, Pressure and Electrical signals. A liquid hydrogen injector may be configured accordingly to suit its properties.

In one embodiment of a control system, a first solenoid is used for filling the injector spaces with fuel. In one embodiment, the filling of injector spaces using the first solenoid is carried out at approximately 200 psi. A second solenoid is operable to control stopping the injection.

Traditional fuel injectors use a high-pressure needle which moves back and forth to open and close an orifice. In the present fuel injector, no high-pressure needle is needed for injection; a volume displacement valve used instead ad discussed above.

The fuel injector of the present system can run low compression, such as 10:1 on diesel fuel using a Hessleman system complete with spark plug, and further can operate as petrol, diesel, or hydrogen motor.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A fuel injector comprising:

a body formed of a housing at a rear portion of the body and a barrel at a front of the body;

a low-pressure piston at the front of the body and engaged with the barrel, the low pressure piston movable relative to the barrel;

a high-pressure piston engaged with the barrel, the high-pressure piston configured to allow fluid to flow through it;

an injection nozzle assembly, the injection nozzle assembly in fluid communication with the high-pressure piston;

wherein a movement of the low-pressure piston causes fluid within the barrel to flow into the high-pressure piston and to the nozzle assembly; and a fuel inlet providing fluid flow to the low-pressure piston and to the high-pressure piston.

2. The fuel injector of claim 1 wherein the injection nozzle assembly is connected to the low-pressure piston.

3. The fuel injector of claim 1 wherein the high-pressure piston has a fluid inlet, and wherein a front face surface area of the low-pressure piston is greater than a surface area of a face of the high-pressure piston that defines a fluid inlet opening.

4. The high-pressure fuel injection system of claim 1, wherein the housing comprises a shuttle housing having an inlet port and an outlet port, wherein the inlet port is in fluid communication with at least one channel that provides fuel to a high-pressure barrel.

5. The fuel injector of claim 1 further comprising a high-pressure barrel positioned within the barrel, the high-pressure barrel interfacing with the high-pressure piston and directing fluid flow from within the barrel to the high-pressure piston and into the nozzle assembly.

6. The fuel injector of claim 5 wherein the high-pressure barrel defines at least one inlet orifice and a high-pressure chamber, a portion of the high-pressure piston movably connected within the high-pressure chamber.

7. The fuel injector of claim 6 further comprising a valve operable to allow fluid flow through the high-pressure barrel inlet orifice to the high-pressure chamber when a pressure differential between the inlet orifice and high-pressure chamber exceeds a predetermined amount.

8. The fuel injector of claim 6 wherein the high-pressure piston is connected to the low-pressure piston such that a movement of the low-pressure piston relative to the barrel causes a corresponding motion of the high-pressure piston within the high-pressure chamber.

9. The fuel injector of claim 1 wherein the high-pressure piston further comprises a valve positioned between a fluid inlet opening and an outlet in communication with the nozzle assembly, the valve operable to allow fluid flow when a pressure differential between the fluid inlet opening and a nozzle aperture exceeds a predetermined amount.

10. The fuel injector of claim 1 wherein the nozzle assembly comprises a plurality of apertures.

11. The fuel injector of claim 10 wherein a first subgroup of the plurality of apertures each have a first diameter, wherein a second subgroup of the plurality of apertures each have a second diameter, and wherein the first subgroup and second subgroup are configured to atomize fuel differently.

12. The fuel injector of claim 10 wherein a first subgroup of the plurality of apertures each have a first cross sectional shape, wherein a second subgroup of the plurality of apertures each have a second cross sectional shape, and wherein the first subgroup and second subgroup are configured to atomize fuel differently.

13. The fuel injector of claim 1 wherein the low-pressure piston is disposed around the high-pressure piston.

14. The fuel injector of claim 1, further comprising a single solenoid valve that is configured to control fluid flow into the fuel inlet.

15. The fuel injector of claim 10 wherein the plurality of apertures of the nozzle assembly are adjacent to a front face of the low-pressure piston.

16. The fuel injector of claim 1 wherein the housing comprises a spring loaded shuttle movable between an open position to allow fluid flow into the barrel, and a closed position blocking fluid flow from entering the barrel, a spring biasing the spring loaded shuttle in the closed position.

17. A combustion chamber comprising a piston and the fuel injector of claim 1.

18. The fuel injector of claim 1 wherein the high-pressure piston is engaged with the barrel by being connected to the low-pressure piston.

19. An internal combustion engine comprising the fuel injector of claim 1.

20. A method of fuel injection comprising the steps of:

compressing a gas within a combustion chamber of a combustion engine by conveying a piston toward an end wall of the combustion chamber;

depressing a low-pressure piston of a fuel injector by an increase in pressure applying a force to the low-pressure piston and causing it to move;

loading a high-pressure chamber of the fuel injector with high pressure fuel by the movement of the low-pressure piston;

overcoming a spring-loaded valve by the pressure within the high-pressure chamber;

spraying fuel from the high-pressure chamber out of a nozzle of the fuel injector after the overcoming of the spring-loaded valve; and igniting the sprayed fuel within the combustion chamber.

21. A fuel injector comprising:

a body formed of a housing at a rear portion of the body and a barrel at a front of the body;

a low-pressure piston at the front of the body and engaged with the barrel, the low pressure piston movable relative to the barrel;

a high-pressure piston, the high-pressure piston configured to allow fluid to flow through it;

wherein the high-pressure piston has a fluid inlet, and wherein a front face surface area of the low-pressure piston is greater than a surface area of a face of the high-pressure piston that defines a fluid inlet opening an injection nozzle assembly, the injection nozzle assembly in fluid communication with the high-pressure piston; and a fuel inlet.

22. A fuel injector comprising:

a body formed of a housing at a rear portion of the body and a barrel at a front of the body;

a low-pressure piston at the front of the body and engaged with the barrel, the low pressure piston movable relative to the barrel;

a high-pressure piston, the high-pressure piston configured to allow fluid to flow through it;

an injection nozzle assembly, the injection nozzle assembly in fluid communication with the high-pressure piston;

a high-pressure barrel positioned within the barrel, the high-pressure barrel interfacing with the high-pressure piston and directing fluid flow from within the barrel to the high-pressure piston and into the nozzle assembly; and a fuel inlet.

23. The fuel injector of claim 22 wherein the high-pressure barrel defines at least one inlet orifice and a high-pressure chamber, a portion of the high-pressure piston movably connected within the high-pressure chamber.

24. The fuel injector of claim 23 further comprising a valve operable to allow fluid flow through the high-pressure barrel inlet orifice to the high-pressure chamber when a pressure differential between the inlet orifice and high-pressure chamber exceeds a predetermined amount.

25. A fuel injector comprising:
- a body formed of a housing at a rear portion of the body and a barrel at a front of the body;
- a low-pressure piston at the front of the body and engaged with the barrel, the low pressure piston movable relative to the barrel;
- a high-pressure piston, the high-pressure piston configured to allow fluid to flow through it;
- an injection nozzle assembly, the injection nozzle assembly in fluid communication with the high-pressure piston;
- wherein the high-pressure piston further comprises a valve positioned between a fluid inlet opening and an outlet in communication with the nozzle assembly, the valve operable to allow fluid flow when a pressure differential between the fluid inlet opening and a nozzle aperture exceeds a predetermined amount; and
- a fuel inlet.

26. A fuel injector comprising:
- a body formed of a housing at a rear portion of the body and a barrel at a front of the body;
- a low-pressure piston at the front of the body and engaged with the barrel, the low pressure piston movable relative to the barrel;
- a high-pressure piston engaged with the barrel, the high-pressure piston configured to allow fluid to flow through it;
- an injection nozzle assembly, the injection nozzle assembly in fluid communication with the high-pressure piston;
- a fuel inlet; and
- a solenoid valve that is configured to control fluid flow into the fuel inlet.

* * * * *